United States Patent
Khoshnevisan et al.

(10) Patent No.: US 12,432,026 B2
(45) Date of Patent: Sep. 30, 2025

(54) QUASI CO-LOCATION DETERMINATION FOR OVERLAPPING DOWNLINK CHANNELS AND SYNCHRONIZATION BLOCKS

(71) Applicant: QUALCOMM Incorporated, San Diego, CA (US)

(72) Inventors: Mostafa Khoshnevisan, San Diego, CA (US); Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 725 days.

(21) Appl. No.: 17/741,220

(22) Filed: May 10, 2022

(65) Prior Publication Data

US 2022/0368486 A1 Nov. 17, 2022

Related U.S. Application Data

(60) Provisional application No. 63/187,130, filed on May 11, 2021.

(51) Int. Cl.
*H04L 5/00* (2006.01)
*H04W 72/0446* (2023.01)

(52) U.S. Cl.
CPC .......... *H04L 5/0048* (2013.01); *H04L 5/0094* (2013.01); *H04W 72/0446* (2013.01)

(58) Field of Classification Search
CPC ..... H04L 5/0048; H04L 5/0094; H04L 5/001; H04W 72/0446; H04W 56/0015; H04B 7/024; H04B 7/0695; H04B 7/088
See application file for complete search history.

(56) References Cited

U.S. PATENT DOCUMENTS 12,108,351 B2 * 10/2024 Khoshnevisan ...... H04W 72/02
2019/0319748 A1 * 10/2019 Nam .................... H04W 72/563
(Continued)

FOREIGN PATENT DOCUMENTS

WO WO-2020215108 A2 10/2020

OTHER PUBLICATIONS

FUTUREWEI: "Inter-Cell Multi-TRP Operation", 3GPP TSG RAN WG1 #104bis-e, R1-2102762, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021 Apr. 7, 2021, XP052177744, 6 Pages, p. 6.

(Continued)

*Primary Examiner* — Rina C Pancholi
(74) *Attorney, Agent, or Firm* — Kevin M. Donnelly; Holland & Hart LLP

(57) ABSTRACT

Methods, systems, and devices for wireless communications are described. A user equipment (UE) may determine a first physical layer cell identifier (PCI) corresponding to a serving cell configured for the UE and a second PCI corresponding to a second cell configured for the UE different than the serving cell. Subsequently, the UE may receive at least one synchronization signal block (SSB) associated with the first PCI or the second PCI, where the SSB overlaps in time with one or more downlink channels. Accordingly, the UE may determine a quasi co-location (QCL) relationship between the SSB and the one or more downlink channels based on which PCI is associated with the SSB. In some examples, the UE may determine the QCL relationship based on a capability of the UE to receive one or two beams simultaneously.

28 Claims, 19 Drawing Sheets

(56) References Cited

U.S. PATENT DOCUMENTS

| | | | |
|---|---|---|---|
| 2021/0045170 A1* | 2/2021 | Luo | H04W 24/08 |
| 2022/0377580 A1* | 11/2022 | Karlsson | H04W 56/0015 |
| 2023/0113940 A1* | 4/2023 | Matsumura | H04W 72/231 |
| 2023/0188283 A1* | 6/2023 | Liu | H04W 72/0453 370/329 |
| 2023/0318687 A1* | 10/2023 | Kim | H04B 7/06968 370/329 |

OTHER PUBLICATIONS

International Search Report and Written Opinion—PCT/US2022/072245—ISA/EPO—Sep. 1, 2022 (2104773WO).

Moderator (OPPO) et al., "CR on PDSCH QCL", 3GPP TSG-RAN WG1 Meeting #104-e, R1-2102004, 3RD Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Feb. 2, 2021, XP051976060, 2 Pages, p. 1.

Qualcomm Incorporated: "Enhancements on Multi-TRP Inter-Cell Operation", 3GPP TSG-RAN WG1 Meeting #104-bis-e, R1-2103152, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021 Apr. 7, 2021, XP052177952, pp. 1-6, Sections 1-2.

Qualcomm Incorporated: "Multi-TRP Enhancements", 3GPP TSG-RAN WG1 Meeting #98bis, R1-1911126, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, XP051789902, 26 Pages, PDCCH Related Enhancements, p. 9, paragraph 3.2—p. 11, para 3.5, Sections 2.1, 2.2, 3.2, 3.5.

* cited by examiner

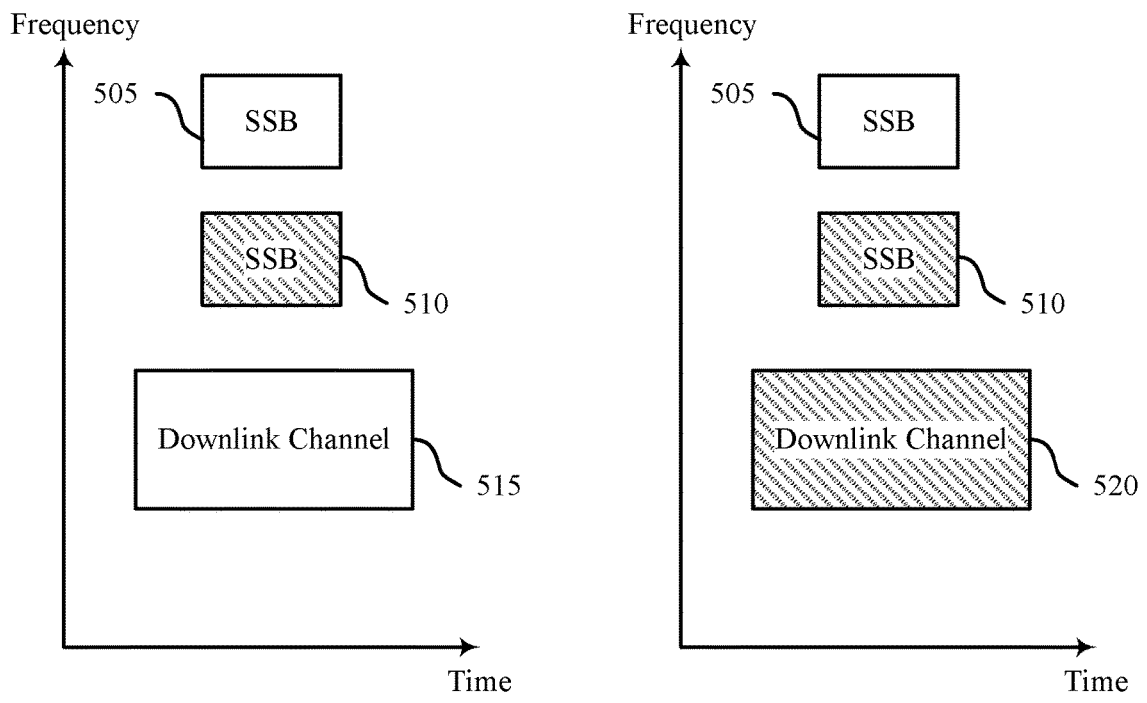
FIG. 5A
FIG. 5B
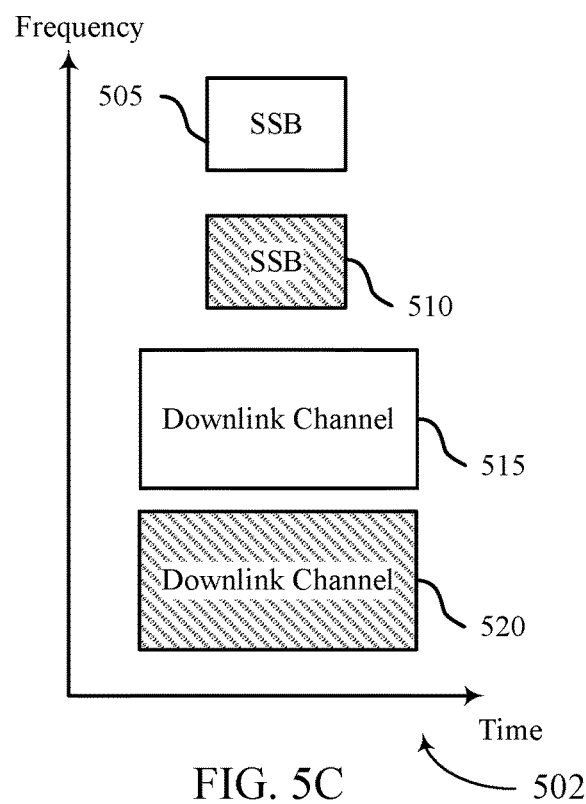
FIG. 5C

QUASI CO-LOCATION DETERMINATION FOR OVERLAPPING DOWNLINK CHANNELS AND SYNCHRONIZATION BLOCKS

CROSS REFERENCE

The present application for patent claims the benefit of U.S. Provisional Patent Application No. 63/187,130 by KHOSHNEVISAN et al., entitled "QUASI CO-LOCATION DETERMINATION FOR OVERLAPPING DOWNLINK CHANNELS AND SYNCHRONIZATION BLOCKS," filed May 11, 2021, assigned to the assignee hereof, and expressly incorporated by reference herein.

FIELD OF TECHNOLOGY

The following relates to wireless communications, including a quasi co-location (QCL) determination for overlapping downlink channels and synchronization blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples, multiple downlink messages sent to a UE may at least partially overlap in time. Techniques are desired for handling and processing of downlink messages that overlap.

SUMMARY

The described techniques relate to improved methods, systems, devices, and apparatuses that support quasi co-location (QCL) determination for overlapping downlink channels and synchronization blocks. Generally, the described techniques provide for a user equipment (UE) to determine a first physical layer cell identifier (PCI) corresponding to a serving cell configured for the UE and a second PCI corresponding to a second cell configured for the UE different than the serving cell (e.g., a non-serving cell). Subsequently, the UE may receive at least one synchronization signal block (SSB) associated with the first PCI or the second PCI, where the SSB overlaps in time with one or more downlink channels. Accordingly, the UE may determine a QCL relationship between the SSB and the one or more downlink channels based on which PCI is associated with the SSB. For example, the UE may determine that SSB and a first downlink channel have a type of a QCL relationship based on both the SSB and the first downlink channel being associated with the same PCI (e.g., both are transmitted from a same cell). The UE may then process the first downlink channel based on the QCL relationship with the SSB. In some examples, the UE may determine the QCL relationship based on a capability of the UE to receive one or two beams simultaneously.

A method for wireless communications at a UE is described. The method may include determining a first PCI corresponding to a serving cell configured for the UE and a second PCI corresponding to a second cell configured for the UE different than the serving cell; receiving an SSB associated with a PCI corresponding to the serving cell or the second cell, the PCI including the first PCI or the second PCI; determining a QCL relationship between the SSB and one or more downlink channels that are overlapping in time with the SSB based on the PCI; and processing a first downlink channel of the one or more downlink channels based on the QCL relationship.

An apparatus for wireless communications at a UE is described. The apparatus may include a processor, memory coupled with the processor, and instructions stored in the memory. The instructions may be executable by the processor to cause the apparatus to determine a first PCI corresponding to a serving cell configured for the UE and a second PCI corresponding to a second cell configured for the UE different than the serving cell; receive an SSB associated with a PCI corresponding to the serving cell or the second cell, the PCI including the first PCI or the second PCI; determine a QCL relationship between the SSB and one or more downlink channels that are overlapping in time with the SSB based on the PCI; and process a first downlink channel of the one or more downlink channels based on the QCL relationship.

Another apparatus for wireless communications at a UE is described. The apparatus may include means for determining a first PCI corresponding to a serving cell configured for the UE and a second PCI corresponding to a second cell configured for the UE different than the serving cell; means for receiving an SSB associated with a PCI corresponding to the serving cell or the second cell, the PCI including the first PCI or the second PCI; means for determining a QCL relationship between the SSB and one or more downlink channels that are overlapping in time with the SSB based on the PCI; and means for processing a first downlink channel of the one or more downlink channels based on the QCL relationship.

A non-transitory computer-readable medium storing code for wireless communications at a UE is described. The code may include instructions executable by a processor to determine a first PCI corresponding to a serving cell configured for the UE and a second PCI corresponding to a second cell configured for the UE different than the serving cell; receive an SSB associated with a PCI corresponding to the serving cell or the second cell, the PCI including the first PCI or the second PCI; determine a QCL relationship between the SSB and one or more downlink channels that are overlapping in time with the SSB based on the PCI; and process a first downlink channel of the one or more downlink channels based on the QCL relationship.

In some examples of the method, apparatuses, and non-transitory computer-readable medium described herein, determining the QCL relationship may include operations, features, means, or instructions for determining the QCL relationship between the SSB and the one or more downlink channels that may be overlapping in time with the SSB based on a capability of the UE.

Some examples of the method, apparatuses, and non-transitory computer-readable medium described herein may further include operations, features, means, or instructions for transmitting an indication of the capability of the UE, where the QCL relationship may be determined based on the indication of the capability of the UE.

In some examples of the method, apparatuses, and non-transitory computer-readable medium described herein, the capability of the UE includes a capability of receiving a single beam at a time, of receiving two beams simultaneously, or a combination thereof.

In some examples of the method, apparatuses, and non-transitory computer-readable medium described herein, determining the QCL relationship may include operations, features, means, or instructions for determining the QCL relationship between the SSB and demodulation reference signals of the one or more downlink channels.

In some examples of the method, apparatuses, and non-transitory computer-readable medium described herein, determining the QCL relationship may include operations, features, means, or instructions for determining the QCL relationship between the SSB and the one or more downlink channels that may be overlapping in time with the SSB based on the one or more downlink channels being associated with the PCI.

In some examples of the method, apparatuses, and non-transitory computer-readable medium described herein, the one or more downlink channels may include a control resource set (CORESET) pool index value associated with the PCI.

Some examples of the method, apparatuses, and non-transitory computer-readable medium described herein may further include operations, features, means, or instructions for determining the first downlink channel and a second downlink channel of the one or more downlink channels overlap in time with the SSB, where the first downlink channel may be associated with the first PCI and the second downlink channel may be associated with the second PCI.

Some examples of the method, apparatuses, and non-transitory computer-readable medium described herein may further include operations, features, means, or instructions for receiving a second SSB that may be overlapping in time with the SSB, the second SSB including a separate PCI different than the PCI, where the separate PCI includes the second PCI based on the PCI including the first PCI or the separate PCI includes the first PCI based on the PCI including the second PCI.

Some examples of the method, apparatuses, and non-transitory computer-readable medium described herein may further include operations, features, means, or instructions for determining a second QCL relationship between the second SSB and a second downlink channel of the one or more downlink channels based on the second SSB and the second downlink channel being associated with the separate PCI and processing the second downlink channel based on the second QCL relationship.

In some examples of the method, apparatuses, and non-transitory computer-readable medium described herein, determining the QCL relationship may include operations, features, means, or instructions for determining the QCL relationship between the SSB and the one or more downlink channels that may be overlapping in time with the SSB based on a number of downlink channels of the one or more downlink channels.

Some examples of the method, apparatuses, and non-transitory computer-readable medium described herein may further include operations, features, means, or instructions for determining the first downlink channel may be associated with at least two transmission configuration indicator (TCI) states, where the QCL relationship may be determined based on the at least two TCI states.

In some examples of the method, apparatuses, and non-transitory computer-readable medium described herein, a first TCI state of the at least two TCI states may be determined for the QCL relationship between the SSB and the first downlink channel.

Some examples of the method, apparatuses, and non-transitory computer-readable medium described herein may further include operations, features, means, or instructions for determining the first downlink channel overlaps in time with the SSB and a second SSB and determining a first QCL relationship between the first downlink channel and the SSB and a second QCL relationship between the first downlink channel and the second SSB, the first QCL relationship based on a first TCI state of the at least two TCI states and the second QCL relationship based on a second TCI state of the at least two TCI states.

In some examples of the method, apparatuses, and non-transitory computer-readable medium described herein, the first PCI may include a serving cell PCI.

In some examples of the method, apparatuses, and non-transitory computer-readable medium described herein, the second PCI may include a non-serving cell PCI.

In some examples of the method, apparatuses, and non-transitory computer-readable medium described herein, the serving cell may be associated with a network entity, and the second cell may be associated with the network entity or an additional network entity.

In some examples of the method, apparatuses, and non-transitory computer-readable medium described herein, the QCL relationship may correspond to a same receive beam used to receive the SSB and the first downlink channel.

A method for wireless communications at a network entity is described. The method may include transmitting, to a UE, first signaling associated with a first PCI corresponding to a serving cell configured for the UE and second signaling including a second PCI corresponding to a second cell configured for the UE different than the serving cell; receiving, from the UE, a capability message including an indication of one or more capabilities of the UE; determining a QCL relationship between an SSB and a first downlink channel of one or more downlink channels based on the capability message; and transmitting, to the UE based on the QCL relationship, the SSB including a PCI corresponding to the serving cell or the second cell and the first downlink channel, the SSB and the first downlink channel overlapping in time and the PCI including the first PCI or the second PCI.

An apparatus for wireless communications at a network entity is described. The apparatus may include a processor, memory coupled with the processor, and instructions stored in the memory. The instructions may be executable by the processor to cause the apparatus to transmit, to a UE, first signaling associated with a first PCI corresponding to a serving cell configured for the UE and second signaling including a second PCI corresponding to a second cell configured for the UE different than the serving cell; receive, from the UE, a capability message including an indication of one or more capabilities of the UE; determine a QCL relationship between an SSB and a first downlink channel of one or more downlink channels based on the capability message; and transmit, to the UE based on the QCL relationship, the SSB including a PCI corresponding to the serving cell or the second cell and the first downlink channel, the SSB and the first downlink channel overlapping in time and the PCI including the first PCI or the second PCI.

Another apparatus for wireless communications at a network entity is described. The apparatus may include means for transmitting, to a UE, first signaling associated with a first PCI corresponding to a serving cell configured for the UE and second signaling including a second PCI corresponding to a second cell configured for the UE different than the serving cell; means for receiving, from the UE, a capability message including an indication of one or more capabilities of the UE; means for determining a QCL relationship between an SSB and a first downlink channel of one or more downlink channels based on the capability message; and means for transmitting, to the UE based on the QCL relationship, the SSB including a PCI corresponding to the serving cell or the second cell and the first downlink channel, the SSB and the first downlink channel overlapping in time and the PCI including the first PCI or the second PCI.

A non-transitory computer-readable medium storing code for wireless communications at a network entity is described. The code may include instructions executable by a processor to transmit, to a UE, first signaling associated with a first PCI corresponding to a serving cell configured for the UE and second signaling including a second PCI corresponding to a second cell configured for the UE different than the serving cell; receive, from the UE, a capability message including an indication of one or more capabilities of the UE; determine a QCL relationship between an SSB and a first downlink channel of one or more downlink channels based on the capability message; and transmit, to the UE based on the QCL relationship, the SSB including a PCI corresponding to the serving cell or the second cell and the first downlink channel, the SSB and the first downlink channel overlapping in time and the PCI including the first PCI or the second PCI.

Some examples of the method, apparatuses, and non-transitory computer-readable medium described herein may further include operations, features, means, or instructions for determining the QCL relationship between the SSB and the first downlink channel based on the first downlink channel being associated with the PCI.

In some examples of the method, apparatuses, and non-transitory computer-readable medium described herein, the first downlink channel may include a CORESET pool index value associated with the PCI.

In some examples of the method, apparatuses, and non-transitory computer-readable medium described herein, the first PCI may include a serving cell PCI.

In some examples of the method, apparatuses, and non-transitory computer-readable medium described herein, the second PCI may include a non-serving cell PCI.

In some examples of the method, apparatuses, and non-transitory computer-readable medium described herein, the serving cell may be associated with the network entity, and the second cell may be associated with the network entity or an additional network entity.

In some examples of the method, apparatuses, and non-transitory computer-readable medium described herein, the QCL relationship may correspond to a same receive beam used by the UE to receive the SSB and the first downlink channel.

In some examples of the method, apparatuses, and non-transitory computer-readable medium described herein, the one or more capabilities of the UE may include a capability of receiving a single beam at a time, of receiving two beams simultaneously, or a combination thereof.

BRIEF DESCRIPTION OF THE DRAWINGS

FIGS. 5A, 5B, and 5C illustrate examples of multi-beam overlapping configurations that supports QCL determination for overlapping downlink channels and synchronization blocks in accordance with aspects of the present disclosure.

DETAILED DESCRIPTION

Figure 1:
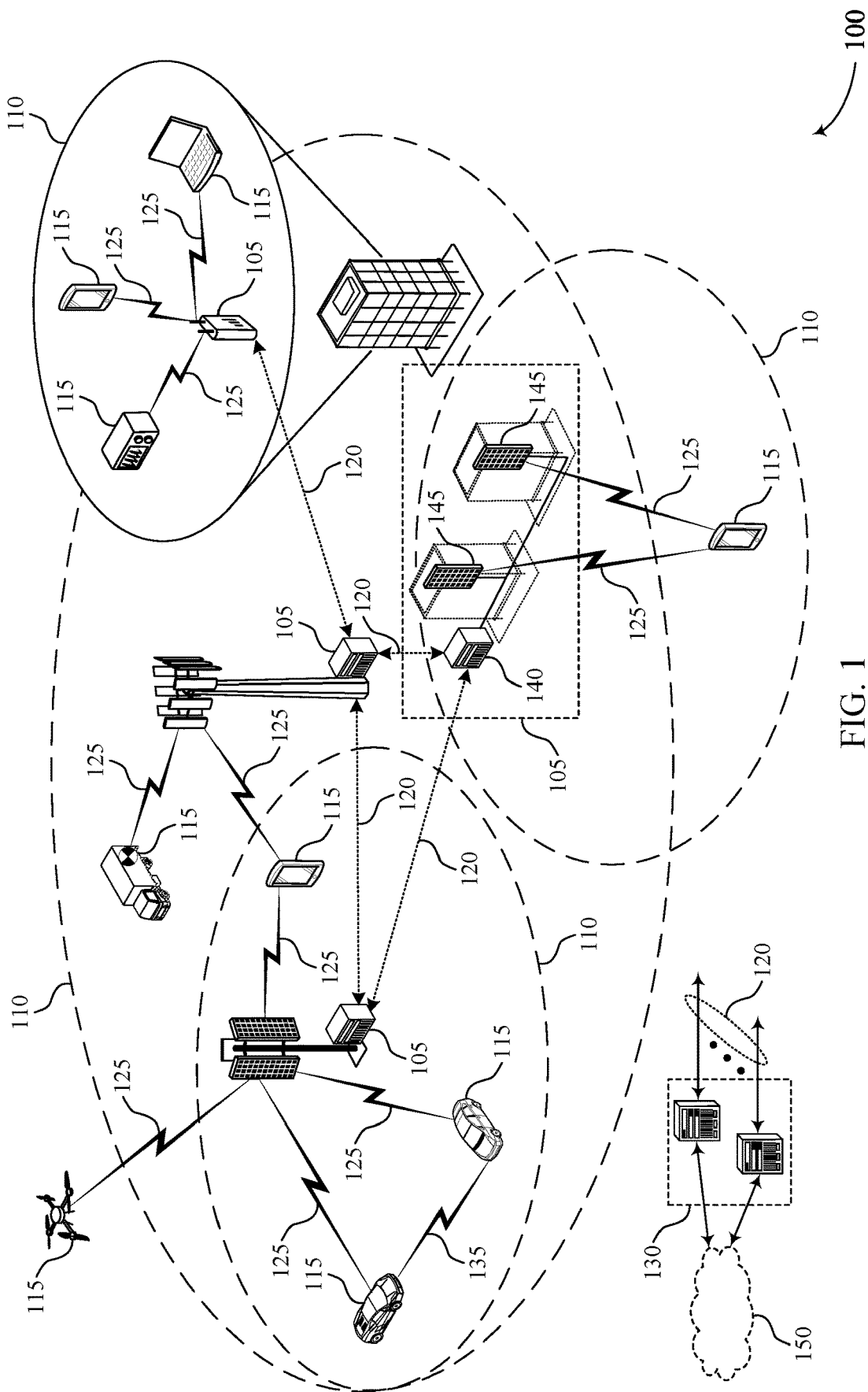
FIG. 1 illustrates an example of a wireless communications system that supports quasi co-location determination for overlapping downlink channels and synchronization blocks in accordance with aspects of the present disclosure.

Prior to exchanging data and additional messages, a user equipment (UE) may monitor for and receive synchronization signals from a cell or network entity, such as one or more components of a base station, to determine configuration and timing information for transmitting and receiving subsequent messages with the cell or base station. For example, the cell or one or more components of the base station may transmit a synchronization signal block (SSB) that includes a primary synchronization signal (PSS), a secondary synchronization signal (SSS), a physical broadcast channel (PBCH), a master information block (MIB), etc. In some examples, the SSB may also include a physical layer cell identifier (PCI) to indicate for which type of cell the SSB is configured. For example, the SSB may include or may be associated with a serving cell PCI (e.g., where the PCI is determined from a PSS and SSS) or a non-serving cell PCI (e.g., one or more additional PCIs configured via radio resource control (RRC) signaling), where the UE uses respective synchronization information for communications with a corresponding serving cell or non-serving cell based on the PCI. Additionally, in some cases, the SSB may overlap in time with one or more downlink channels transmitted by a same or different cell than the cell that transmits the SSB. Techniques are desired for determining whether information for the SSB can be used to receive a downlink channel of the one or more downlink channels that overlap in time with the SSB.

As described herein, a UE may determine a quasi co-location (QCL) relationship between an SSB and a downlink channel that overlap in time based on whether the UE is capable of receiving two beams simultaneously or not. For example, if the UE is not capable of receiving two beams simultaneously and if a downlink channel (e.g., a physical downlink shared channel (PDSCH)) overlaps in time with an SSB, the UE may assume that a demodulation reference signal (DMRS) of the downlink channel and the SSB are quasi co-located (QCLed) with a 'TypeD' (e.g., a same receive beam is used for receiving the SSB and the DMRS of the downlink channel). For example, the UE may expect that both the SSB and the overlapping downlink channel are associated with a same PCI (e.g., or a control resource set (CORESET) pool index value that corresponds to a same PCI). That is, the UE may assume this QCL relationship between the SSB and the overlapping downlink channel if both the SSB and the overlapping downlink channel are transmitted by a same serving cell or a same non-serving cell (e.g., as indicated by the same PCI).

Additionally or alternatively, if the UE is capable of receiving two beams simultaneously and if more than one downlink channel overlaps in time with a given SSB, the UE may assume that a DMRS of one of the downlink channels and the SSB are QCLed with 'TypeD' if that one downlink channel is associated with a same PCI configured for the SSB. Similarly, if the UE receives a first SSB associated with a serving cell PCI and a second SSB associated with a non-serving cell PCI that are overlapping in time, the UE may assume downlink channels that also overlap in time with the SSBs are QCLed with one of the SSBs based on a PCI value associated with the downlink channels.

Aspects of the disclosure are initially described in the context of wireless communications systems. Additionally, aspects of the disclosure are illustrated through an additional wireless communications system, overlapping configurations for single beam and multi-beam scenarios, and a process flow. Aspects of the disclosure are further illustrated by and described with reference to apparatus diagrams, system diagrams, and flowcharts that relate to QCL determination for overlapping downlink channels and synchronization blocks.

FIG. 1 illustrates an example of a wireless communications system 100 that supports QCL determination for overlapping downlink channels and synchronization blocks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

As described herein, a base station 105 may include components that are located at a single physical location or components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 or a base station 105 including components that are located at various physical locations. In some implementations, such a base station 105 including components that are located at various physical locations may be referred to as or may be associated with a disaggregated radio access network (RAN) architecture, such as an Open RAN (O-RAN) or Virtualized RAN (VRAN) architecture.

As used herein, the term "network entity" may refer to a standalone base station, a component of a base station (such as one of components that are physically or logically separated to collectively implement the functionality of a base station), or another network device that communicates with, or supports communication with a UE 115.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may monitor for and receive synchronization signals from a cell or base station 105. The UE 115 may use the synchronization signals to determine configuration and timing information for transmitting and receiving subsequent messages with the cell or base station 105. In some examples, the base station 105 may transmit an SSB (e.g., over 4 OFDM symbols) including the synchronization signals, such as a PSS, an SSS, a PBCH, an MIB, or a combination thereof (e.g., an SSB may be referred to as a synchronization signal (SS)/PBCH block). In some cases, the base station 105 may transmit the synchronization signals in a synchronization signal burst set, which may be a set of SSBs within a beam-sweep (e.g., during a 5 millisecond (ms) time interval in a first or second half of a frame). The periodicity of the synchronization signal burst set may vary (e.g., 5 ms, 10 ms, 20 ms, . . . 160 ms with a default periodicity of 20 ms). In some examples, there may be a maximum number of SSBs within a synchronization signal burst set (e.g., 4 for sub-3 GHz, 8 for sub-7 GHz, 64 for Frequency Range 2 (FR2)).

In some cases, the base station 105 or cells may transmit the SSBs with different beams. The beams may be indexed with an SSB index (e.g., 0, 1 . . . 63 for 64 SSBs). The time domain location, such as a slot or one or more OFDM symbols, of each SSB may be from a set of patterns (e.g., a defined or fixed set of patterns). The patterns may depend on subcarrier spacing (e.g., 15 or 30 kHz for Frequency Range 1 (FR1) and 120 or 240 kHz for FR2). The base station 105 may indicate a location of the SSBs to the UE 115. For example, the base station 105 may transmit one or more SSB indices that the base station 105 transmits as a parameter in control signaling (e.g., ssb-PositionsInBurst in a system information block (SIB), such as SIB Type 1 (SIB1), or in ServingCellConfigCommon).

In some communications systems, a PDSCH may include or may be associated with one transmission configuration indication (TCI) state (e.g., one receive beam or one QCL-TypeD relationship). Further, two PDSCHs may not overlap in the time domain. Additionally or alternatively, a single PDSCH may include or may be associated with two (2) TCI states (e.g., two receive beams or two QCL-TypeD relationships). For example, the two (2) TCI states may be applied in spatial division multiplexing (SDM) (e.g., to different layers), in FDM (e.g., to different resource blocks), in TDM (e.g., to different symbols), etc. This use of the two (2) TCI states per PDSCH may correspond to a single-downlink control information (DCI) based multi-TRP feature, where one DCI schedules one multi-TCI state PDSCH. In some cases, a single frequency network (SFN) PDSCH may be specified where each DMRS port and data layer may be associated with two (2) TCI states.

Additionally or alternatively, two (2) PDSCHs may be time-overlapping when the PDSCHs are associated with different CORESET pool index values (e.g., CORESET-PoolIndex values). An association with CORESET pool index values and corresponding PDSCHs may be based on CORESETs in which scheduling DCIs for each PDSCH are detected. For example, each CORESET may be configured with a CORESET pool index values (e.g., '0' or '1'), such that CORESETs may be grouped into two (2) groups. In some cases, the CORESET pool index values may effectively be interpreted as TRP identifiers (IDs). Additionally, the two (2) PDSCHs may have different TCI states (e.g., different QCL-TypeD or different receive beams associated with each PDSCH). The different TCI states may be used for a multi-DCI based multi-TRP feature, where corresponding DCIs from two TRPs schedule corresponding PDSCHs which can be overlapping.

In some cases, a PDSCH may overlap in time with an SSB, such that a UE 115 that receives both the PDSCH and the SSB may determine a QCL-TypeD for the overlapping PDSCH and SSB. For example, if an SSB and a PDSCH are time-overlapping, the UE 115 may assume that a receive beam of the SSB is the same for PDSCH reception (e.g., a QCL-TypeD for the SSB may correspond to a receive beam used for receiving the SSB, where the SSB and the PDSCH have a same QCL-TypeD). That is, if the UE 115 receives a DMRS for the PDSCH and an SSB (e.g., SS/PBCH block) in one or more same OFDM symbol(s), then the UE 115 may assume that the DMRS and the SSB are QCLed with 'typeD' (e.g., a same receive beam is used for receiving both the DMRS of the PDSCH and the SSB), if 'typeD' is applicable.

Additionally or alternatively, for a single-DCI based multi-TRP scenario, if an SSB and a multi-TCI state PDSCH are time-overlapping, the UE 115 may assume that a receive beam of the SSB is the same as one of the receive beams for PDSCH reception. That is, if at least one TCI codepoint indicates two TCI states and the UE 115 receives a DMRS for a PDSCH and an SSB (e.g., SS/PBCH block) in one or more same OFDM symbol(s), then the UE 115 may assume that at least one DMRS port for the PDSCH and the SSB are QCLed with 'QCL-TypeD', if 'QCL-TypeD' is applicable (e.g., a same receive beam is used to receive the at least one DMRS port of the PDSCH that was used to receive the SSB). Additionally or alternatively, for multi-DCI based multi-TRP scenarios, if an SSB and two (2) PDSCHs are time-overlapping, the UE 115 may assume that a receive beam of the SSB is the same for at least one of the receive beams for PDSCH reception. That is, if the UE 115 is configured by a higher layer parameter for physical downlink control channel (PDCCH) configuration (e.g., PDCCH-Config) that contains two different CORESET pool index values (e.g., CORESETPoolIndex values) in different CORESET configurations (e.g., ControlResourceSets) and the UE 115 receives the DMRS for PDSCH(s) and an SSB (e.g., SS/PBCH block) in one or more same OFDM symbol(s), then the UE 115 may assume that at least one DMRS port for the PDSCH(s) and the SSB are QCLed with 'QCL-TypeD', if 'QCL-TypeD' is applicable (e.g., a same receive beam is used to receive the at least one DMRS port of the PDSCH that was used to receive the SSB).

In some cases, a UE 115 may communicate with one or more base stations 105, one or more cells, one or more TRPs, or a combination thereof. In some examples, a TCI state for a cell or TRP may be defined according to QCL information that configures a reference signal. In some other examples, each cell may have a defined PCI and SSB set. In some cases, a UE 115 may be configured with different PCIs and SSB sets configured for a serving cell and one or more non-serving cells. For a serving cell PCI, the UE 115 may determine the PCI from a PSS and SSS acquired in initial access procedures. Additionally or alternatively, for non-serving cell PCIs, a base station 105 (e.g., that includes the serving cell configured for the UE 115) may configure and signal the non-serving cell PCIs to the UE 115 (e.g., via RRC signaling). An SSB set may be configured for the UE 115 associated with the RRC configured non-serving cell PCIs. If multiple non-serving cell PCIs are configured for the UE 115, the base station 105 may configure multiple corresponding SSB sets.

The non-serving cell PCIs/SSB sets may enable a TCI state or QCL information to be defined based on an SSB index from a set of SSBs associated with a neighbor PCI (e.g., a neighbor cell). For example, downlink channel (e.g., PDSCH or PDCCH) TCI states associated with different PCIs may be indirectly QCLed with an SSB associated with corresponding PCIs. As such, for multi-TRP transmissions when a second TRP has a different PCI than a PCI associated with or configured for a first TRP (e.g., intercell multi-TRP), the UE 115 may determine QCL information for each TRP based on the corresponding PCIs. In some examples, for a multi-DCI based multi-TRP scenario, a serving base station 105 may configure two (or more) CORESET pool index values (e.g., CORESETPoolIndex values) for different CORESETs to associate the different TRPs with corresponding PCIs.

In some cases, such as for intercell multi-TRP operation, a UE 115 and a base station 105 may support an additional PCI that may be different from the serving cell PCI per component carrier. The additional PCI may be associated with one or more activated TCI states for a reference signal (e.g., CSI-RS for CSI), a downlink shared channel, a downlink control channel, or a combination thereof per component carrier, such as for scenarios with a non-cross carrier QCL indication. In some examples, the base station 105 and UE 115 may determine non-serving cell SSB information. For example, the information may include an SSB time domain position, SSB transmission periodicity, SSB transmission power, other non-serving cell information, or the like (e.g., according to an implicit or explicit indication).

As described previously, an SSB may overlap in time with one or more downlink channels transmitted by a same or different cell than the cell that transmits the SSB. However, if a UE 115 that receives the SSB and overlapping downlink channels determines or is configured with multiple PCIs (e.g., a serving cell PCI and one or more non-serving cell PCIs), techniques are desired for determining whether information for the SSB can be used to receive a downlink channel of the one or more downlink channels that overlap in time with the SSB. That is, techniques are desired for determining whether a QCL-TypeD (e.g., an indication corresponding to a receive beam) assumption in case of time-overlap between SSBs and PDSCHs can be extended in the case of non-serving PCIs or not.

Wireless communications system 100 may support efficient techniques for enabling a UE 115 to determine a QCL relationship between an SSB and a downlink channel that overlap in time based on whether the UE 115 is capable of receiving two beams simultaneously or not. For example, if the UE 115 is not capable of receiving two beams simultaneously and if a downlink channel (e.g., a PDSCH) overlaps in time with an SSB, the UE 115 may assume that a DMRS of the downlink channel and the SSB are QCLed with 'TypeD' (e.g., a same receive beam is used for receiving the SSB and the DMRS of the downlink channel). In some examples, the UE 115 may expect that both the SSB and the overlapping downlink channel are associated with a same PCI (e.g., or a CORESET pool index value that corresponds to a same PCI). Additionally or alternatively, if the UE 115 is capable of receiving two beams simultaneously and if more than one downlink channel overlaps in time with a given SSB, the UE 115 may assume that a DMRS of one of the downlink channels and the SSB are QCLed with 'TypeD' if that one downlink channel is associated with a same PCI configured for the SSB. Similarly, if the UE receives a first SSB associated with a serving cell PCI and a second SSB associated with a non-serving cell PCI that are overlapping in time, the UE 115 may assume downlink channels that also overlap in time with the SSBs are QCLed with one of the SSBs based on a PCI value associated with the downlink channels.

Figure 2:
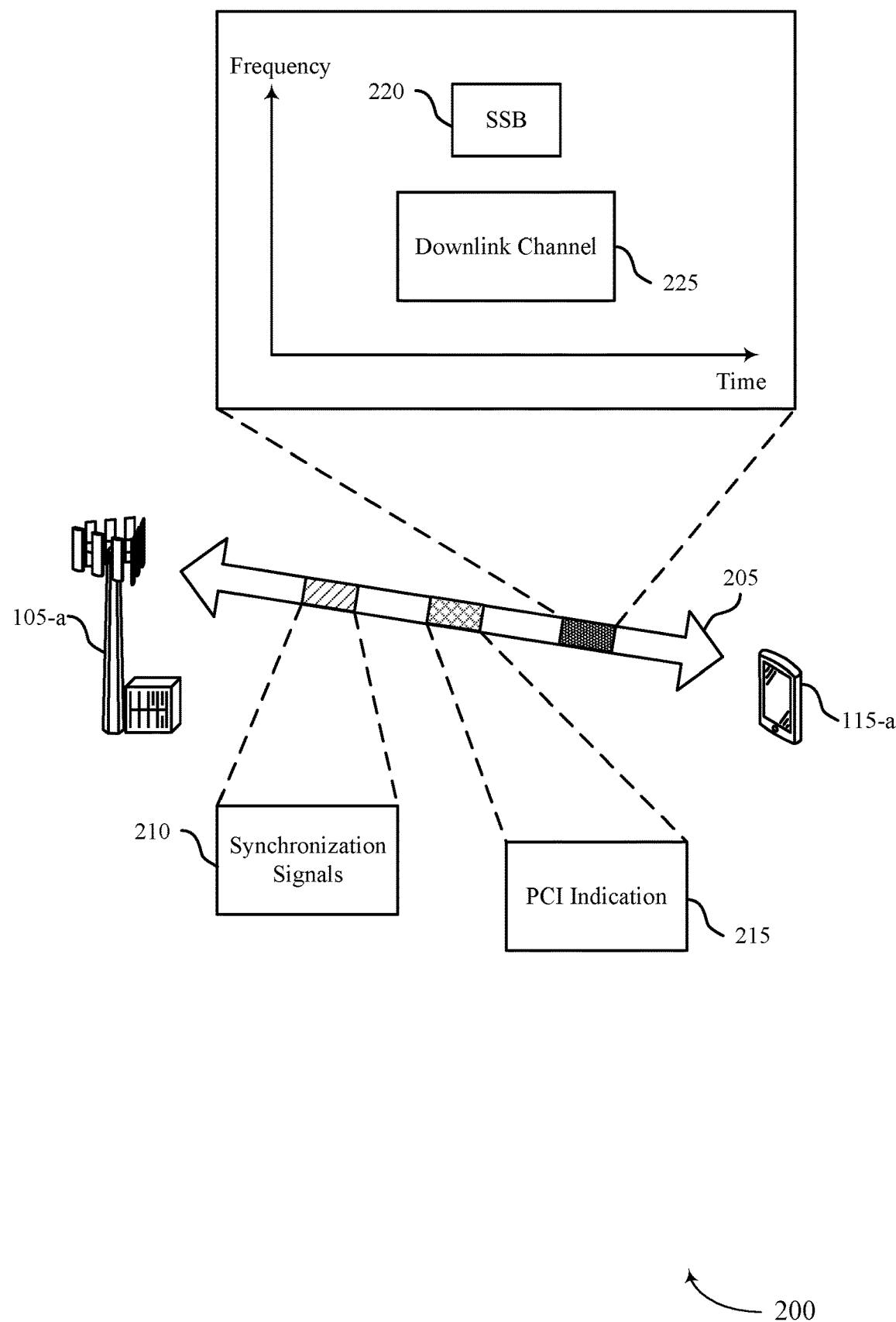
FIG. 2 illustrates an example of an additional wireless communications system that supports QCL determination for overlapping downlink channels and synchronization blocks in accordance with aspects of the present disclosure.

FIG. 2 illustrates an example of a wireless communications system 200 that supports QCL determination for overlapping downlink channels and synchronization blocks in accordance with aspects of the present disclosure. In some examples, wireless communications system 200 may implement aspects of or may be implemented by aspects of wireless communications system 100. For example, wireless communications system 200 may include a base station 105-*a* and a UE 115-*a*, which may represent examples of corresponding base stations 105 and UEs 115, respectively, as described with reference to FIG. 1. Additionally, base station 105-*a* and UE 115-*a* may communicate control information, data, or both using resources of a carrier 205. Base station 105-*a* and UE 115-*a* may also use beamforming to support communications with each other on the resources of carrier 205.

In some examples, UE 115-a may communicate with base station 105-a via multiple cells of base station 105-a. For example, base station 105-a may include a serving cell configured UE 115-a, such that base station 105-a is considered a serving base station 105 for UE 115-a, as well as including one or more non-serving cells configured for additional communications with UE 115-a. Additionally or alternatively, UE 115-a may communicate with base station 105-a via the serving cell and may communicate with additional base stations 105 via the one or more non-serving cells.

Each cell that is used for communications with UE 115-a may be associated with separate PCIs. For example, the serving cell may be associated with a first PCI (e.g., a serving cell PCI), and at least one non-serving cell may be associated with a second PCI (e.g., a non-serving cell PCI). In some examples, UE 115-a may determine the first PCI for the serving cell based on synchronization signals 210 acquired from base station 105-a. For example, UE 115-a may determine the first PCI for the serving cell (e.g., for a primary cell (PCell)) during cell search (e.g., as part of initial access) by detecting a PSS and/or SSS of an SSB broadcasted by base station 105-a. Base station 105-a may scramble the PSS and/or SSS the first PCI, and UE 115-a may obtain the PCI as part of detecting the PSS/SSS. That is, UE 115-a may try all possible PCI values (e.g., 1008 PCI values) for descrambling the PSS/SSS, and the PCI that results in successful detection may be determined to be the first PCI for the serving cell. Additionally, for the non-serving cells, base station 105-a may transmit a PCI indication 215 that configures PCIs for each configured non-serving cell, including the second PCI.

Subsequently, after determining respective PCIs associated with different cells, UE 115-a may communicate with base station 105-a and/or the additional base stations 105 based on the PCIs. The PCIs may also enable UE 115-a to determine QCL relationships for overlapping downlink messages received via corresponding cells. For example, as described herein, UE 115-a may receive an SSB 220 and a downlink channel 225 (e.g., a PDSCH) that overlap in time, where SSB 220 and downlink channel 225 are associated with same or different PCIs (e.g., indicating the SSB 220 and the downlink channel 225 are received via a same cell or different cells).

In some examples, UE 115-a may determine whether downlink channel 225 is associated with a serving cell PCI or another PCI, such as a non-serving cell PCI, based on a control message from base station 105-a. For example, UE 115-a may receive the control message from base station 105-a via carrier 205. UE 115-a may identify a CORESET pool index value for downlink channel 225 based on the control message. In some cases, the control message may dynamically schedule downlink channel 225 (e.g., via a DCI message). UE 115-a may identify the CORESET pool index value based on the CORESET pool index value of the CORESET in which UE 115-a receives the scheduling DCI. In some other cases, the control message may semi-persistently schedule downlink channel 225. UE 115-a may identify the CORESET pool index value based on the CORESET pool index value of the CORESET in which UE 115-a receives an activating DCI. Additionally or alternatively, UE 115-a may identify the CORESET pool index value based on the CORESET pool index value for a semi-persistent scheduling (SPS) configuration. Base station 105-a may RRC configure the SPS configuration with a CORESET Pool Index value of '0' or '1.' In some cases, if the CORESET pool index value is '0,' downlink channel 225 may be associated with a serving cell. In other cases, if the CORESET pool index value is '1,' downlink channel 225 may be associated with another cell, such as a non-serving cell.

In some other examples, UE 115-a may determine whether downlink channel 225 is associated with a serving cell PCI or another PCI, such as a non-serving cell PCI, based on an indirect QCL relationship, such as a top QCL chain. In some examples, once UE 115-a determines whether resource element overlap is permitted, UE 115-a may process downlink channel 235 (e.g., and/or a DMRS of downlink channel 235).

In some examples, UE 115-a may determine a QCL relationship between SSB 220 and downlink channel 225 based on the downlink signals overlapping in time and based on whether UE 115-a is capable of receiving two beams simultaneously or not. If UE 115-a is not capable of receiving two beams simultaneously, UE 115-a may assume that a DMRS of downlink channel 225 and SSB 220 are QCLed with a 'TypeD' (e.g., a same receive beam is used for receiving SSB 220 and the DMRS of downlink channel 225). For example, UE 115-a may expect that both SSB 220 and downlink channel 225 are associated with a same PCI (e.g., or a same CORESET pool index value that corresponds to a same PCI) when overlapping to then determine that the DMRS of downlink channel 225 and SSB 220 are QCLed with a 'TypeD'. That is, UE 115-a may assume this QCL relationship between SSB 220 and downlink channel 225 that overlaps in time with SSB 220 if both SSB 220 and downlink channel 225 are transmitted by a same serving cell or a same non-serving cell (e.g., as indicated by the same PCI). The determination of the QCL relationship between overlapping SSBs and downlink channels when UE 115-a is not capable of receiving two beams simultaneously is described in more detail with reference to FIG. 3.

Additionally or alternatively, if UE 115-a is capable of receiving two beams simultaneously and if more than one downlink channel 225 overlaps in time with SSB 220, UE 115-a may assume that a DMRS of one of the downlink channels 225 and SSB 220 are QCLed with 'TypeD' if that one downlink channel 225 is associated with a same PCI configured for SSB 220. The determination of the QCL relationship between an overlapping SSB and multiple downlink channels when UE 115-a is capable of receiving two beams simultaneously is described in more detail with reference to FIGS. 4A-4C. Similarly, if UE 115-a receives a first SSB 220 associated with a serving cell PCI and a second SSB 220 associated with a non-serving cell PCI that are overlapping in time, UE 115-a may assume downlink channels 225 that also overlap in time with the SSBs 220 are QCLed with one of the SSBs 220 based on a PCI value associated with the downlink channels 225 (e.g., a downlink channel associated with the serving cell PCI is QCLed with the first SSB 220, a downlink channel associated with the non-serving cell PCI is QCLed with the second SSB 220, etc.). The determination of the QCL relationship between multiple overlapping SSBs and one or more downlink channels when UE 115-a is capable of receiving two beams simultaneously is described in more detail with reference to FIGS. 5A-5C.

While the techniques herein are described for scenarios when a downlink channel (e.g., a PDSCH) overlaps in time with an SSB, the techniques may be extended to scenarios where different types of downlink channels or messages (e.g., PDCCHs, CSI-RSs, etc.) also overlap with an SSB to determine QCL relationships for the different types of downlink channels or messages. For example, UE 115-a may determine a QCL relationship between one of these different types of downlink channels/messages and overlapping in time SSBs for scenarios where the SSB is a serving cell SSB or a non-serving cell SSB based on PCIs associated with the SSBs and the downlink channels/messages or based on different information.

Additionally, if downlink channel 225 two (2) TCI states (e.g., two QCL-TypeD) based on different multiplexing or transmission configurations (e.g., SDM, SFN, FDM, TDM schemes) and if downlink channel 225 overlaps with one SSB 220 (e.g., either serving cell or non-serving cell SSB), UE 115-a may determine at least one QCL-TypeD of downlink channel 225 is the same as a QCL-TypeD of the one SSB 220 (e.g., at least one TCI state or corresponding receive beam configured for downlink channel 225 is the same as a receive beam used to receive SSB 220). Additionally or alternatively, if downlink channel 225 overlaps with two (2) SSBs (e.g., a first SSB 220 is associated with a serving cell PCI and a second SSB 220 is associated with a non-serving cell PCI), one QCL-TypeD of downlink channel 225 may be based on a QCL assumption with which SSB 220 is associated with the serving cell (e.g., the first SSB 220 based on being associated with the serving cell PCI) and another QCL-TypeD of downlink channel may be based on a QCL assumption with which SSB 220 is associated with a non-serving cell (e.g., the second SSB 220 based on being associated with the non-serving PCI).

Figure 3:
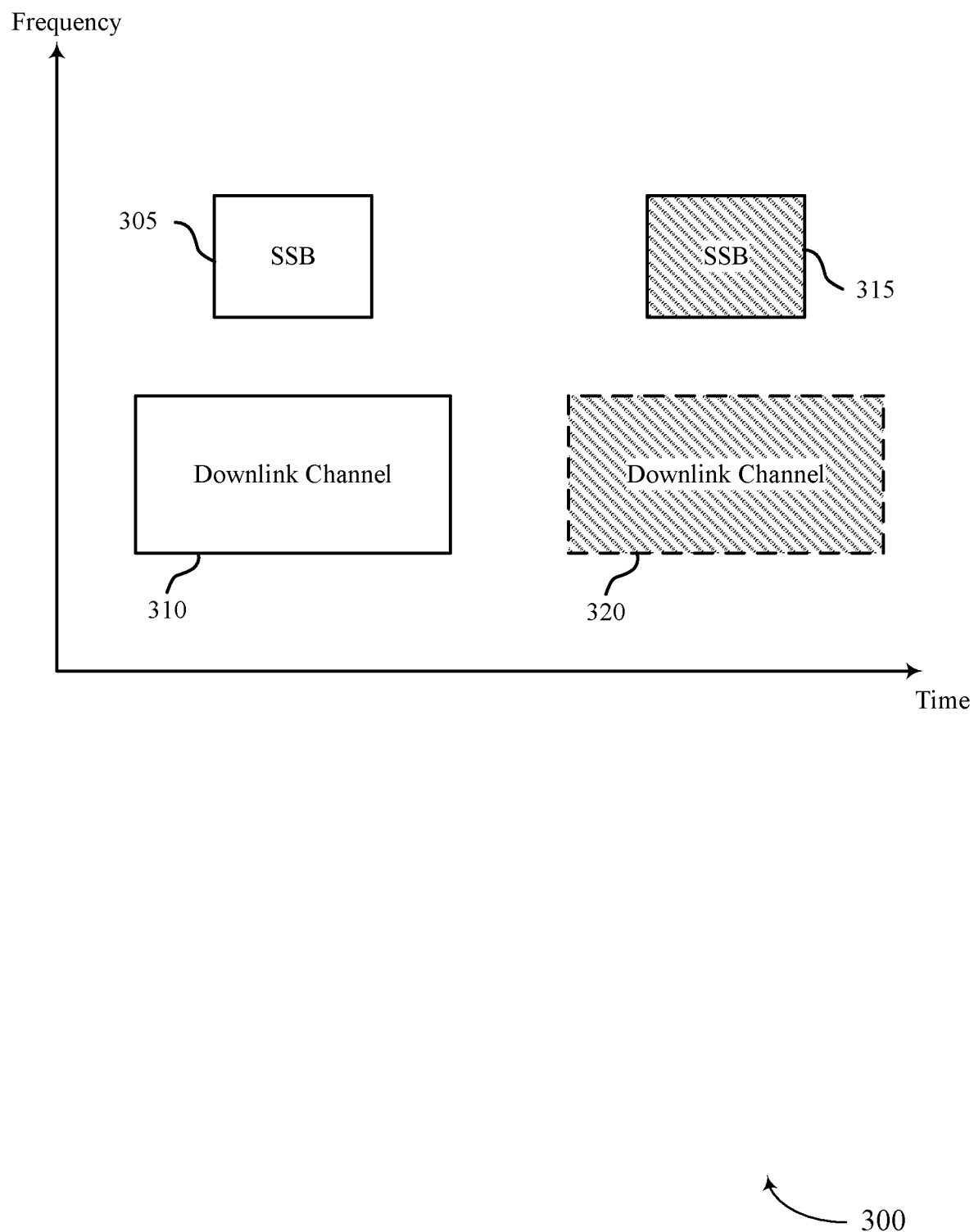
FIG. 3 illustrates an example of a single beam overlapping configuration that supports QCL determination for overlapping downlink channels and synchronization blocks in accordance with aspects of the present disclosure.

FIG. 3 illustrates an example of a single beam overlapping configuration 300 that supports QCL determination for overlapping downlink channels and synchronization blocks in accordance with aspects of the present disclosure. Single beam overlapping configuration 300 may implement aspects of or may be implemented by aspects of wireless communications system 100, wireless communications system 200, or both. For example, a UE 115 may determine a QCL relationship between an SSB and one or more downlink channels that overlap in time with the SSB as shown in single beam overlapping configuration 300 based on the techniques described herein when the UE 115 is not capable of receiving two beams simultaneously.

If a downlink channel overlaps in time with a serving cell SSB 305 (e.g., an SSB configured for or associated with a serving cell for the UE 115), the UE 115 may assume that a DMRS of a downlink channel 310 and serving cell SSB 305 are QCLed with 'TypeD' (e.g., a same receive beam can be used for receiving or processing the downlink channel and the SSB). For example, the UE 115 may expect that the overlapping downlink channel 310 is also associated with a serving cell PCI that is configured or associated with the serving cell SSB 305. In some examples, when serving cell and non-serving cell distinction or association is based on CORESET pool index values as described previously with reference to FIG. 1, the UE 115 may expect that the CORESET pool index value associated with the downlink channel 310 corresponds to the serving cell (e.g., the CORESET pool index value is '0'). In the case of dynamic downlink channel transmission, the downlink transmission of the downlink channel 310 may be scheduled with a DCI that is received in a CORESET with the CORESET pool index value corresponding to the serving cell (e.g., '0').

Additionally or alternatively, for a non-serving cell SSB 315 (e.g., an SSB configured with or associated with a non-serving PCI), the UE 115 may assume that a DMRS of a downlink channel 320 and non-serving cell SSB 315 are QCLed with 'TypeD' (e.g., a same receive beam can be used for receiving or processing the downlink channel and the SSB). For example, the UE 115 may expect that the overlapping downlink channel 320 is also associated with a non-serving cell PCI that is configured or associated with the non-serving cell SSB 315. In some examples, when serving cell and non-serving cell distinction or association is based on CORESET pool index values as described previously with reference to FIG. 1, the UE 115 may expect that the CORESET pool index value associated with the downlink channel 320 corresponds to non-serving cells (e.g., the CORESET pool index value is '1'). In the case of dynamic downlink channel transmission, the downlink channel 320 may be scheduled with a DCI that is received in a CORESET with the CORESET pool index value corresponding to non-serving cells (e.g., '1'). Additionally or alternatively, for non-serving cell SSB 315, the UE 115 may not expect a downlink channel 320 to overlap in time with non-serving cell SSB 315 when QCL-TypeD is applicable (e.g., for FR2).

Figure 4A:
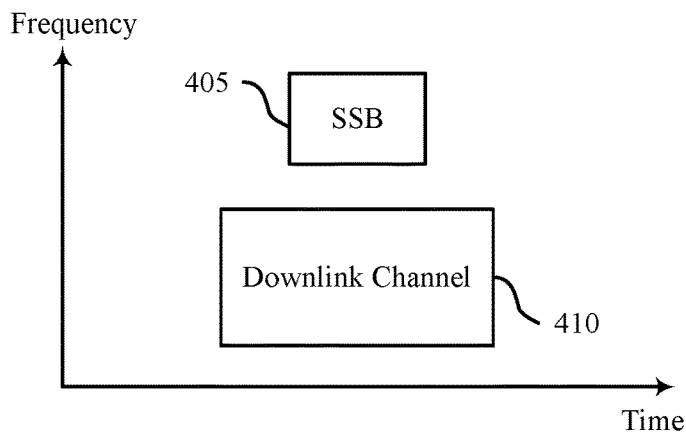
FIGS. 4A, 4B, and 4C illustrate examples of multi-beam overlapping configurations that supports QCL determination for overlapping downlink channels and synchronization blocks in accordance with aspects of the present disclosure.
Figure 4B:
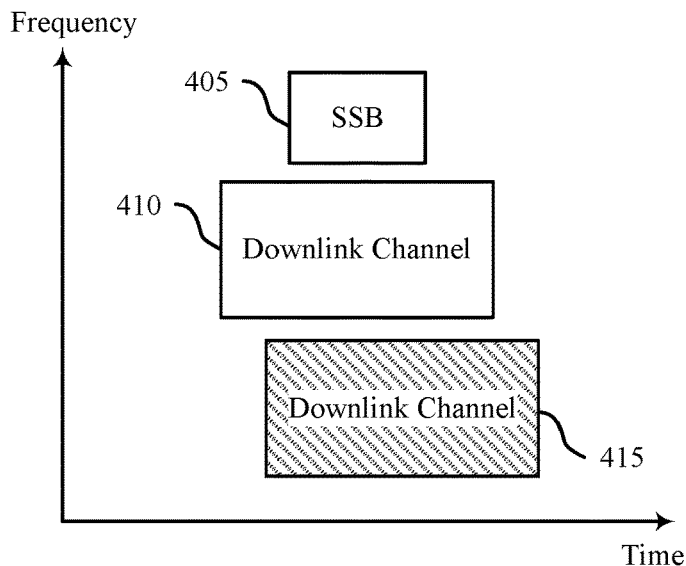
Figure 4C:
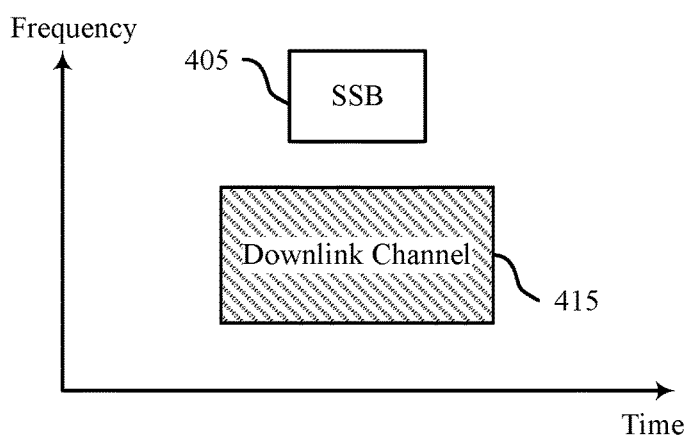

FIGS. 4A, 4B, and 4C illustrate examples of a multi-beam overlapping configuration 400, a multi-beam overlapping configuration 401, and a multi-beam overlapping configuration 402, respectively, that support QCL determination for overlapping downlink channels and synchronization blocks in accordance with aspects of the present disclosure. Multi-beam overlapping configuration 400, multi-beam overlapping configuration 401, and multi-beam overlapping configuration 402 may implement aspects of or may be implemented by aspects of wireless communications system 100, wireless communications system 200, or both. For example, a UE 115 may determine a QCL relationship between an SSB and one or more downlink channels that overlap in time with the SSB as shown in one of the multi-beam overlapping configurations based on the techniques described herein when the UE 115 is capable of receiving two beams simultaneously. Additionally, in multi-beam overlapping configuration 400, multi-beam overlapping configuration 401, and multi-beam overlapping configuration 402, SSBs associated with a serving cell PCI and SSBs associated with non-serving cell PCIs may not be time-overlapping.

If one or more downlink channels overlap in time with a serving cell SSB, the UE 115 may assume that a DMRS of at least one downlink channel and the serving cell SSB are QCLed with 'TypeD' (e.g., same receive beam) if that downlink channel is associated with the serving cell PCI. In some examples, when serving cell and non-serving cell distinction or association is based on CORESET pool index values as described previously with reference to FIG. 1, if a CORESET pool index value associated with that downlink channel is '0,' the UE 115 may assume the downlink channel (e.g., or DMRS of the downlink channel) is QCLed with 'TypeD' with the serving cell SSB. In the case of dynamic downlink channel transmission, the QCLed downlink channel may be scheduled with a DCI that is received in a CORESET with the CORESET pool index value that corresponds to the serving cell (e.g., '0'). In some examples, the UE 115 may expect that the other downlink channel (if any) to be associated with a non-serving cell (e.g. associated with a CORESET pool index value of '1'). Additionally, QCL-TypeD of the serving cell SSB and the other downlink channel may be different (e.g., different receive beams are used for receiving and processing each).

Additionally or alternatively, for a non-serving cell SSB (e.g., an SSB associated with a non-serving PCI), if one or more downlink channels overlap in time with the non-serving cell SSB, the UE 115 may assume that a DMRS of at least one downlink channel and the non-serving cell SSB are QCLed with 'TypeD' (e.g., same receive beam) if that downlink channel is associated with the non-serving cell PCI. In some examples, when serving cell and non-serving cell distinction or association is based on CORESET pool index values as described previously with reference to FIG. 1, if a CORESET pool index value associated with that downlink channel is '1,' the UE 115 may assume the downlink channel (e.g., or DMRS of the downlink channel) is QCLed with 'TypeD' with the non-serving cell SSB. In the case of dynamic downlink channel transmission, the QCLed downlink channel may be scheduled with a DCI that is received in a CORESET with the CORESET pool index value that corresponds to non-serving cells (e.g., '1'). In some examples, the UE 115 may expect that the other downlink channel (if any) to be associated with a serving cell (e.g. associated with a CORESET pool index value of '0'). Additionally, QCL-TypeD of the non-serving cell SSB and the other downlink channel may be different (e.g., different receive beams are used for receiving and processing each).

In some examples, the UE 115 may not expect two (2) downlink channels (e.g., PDSCHs) to overlap in-time with a non-serving cell SSB when QCL-TypeD is applicable (e.g., for FR2). For example, the UE 115 may assume that downlink channels that are associated with non-serving cells can overlap with the non-serving cell SSB, and, as such, the UE 115 may use a same QCL-TypeD as the non-serving cell SSB for receiving and processing the downlink channels associated with non-serving cells. Additionally or alternatively, the UE 115 may assume that downlink channels that are associated with the serving cell can overlap with the non-serving cell SSB, and as such, the QCL-TypeD of the non-serving cell SSB and the downlink channels that are associated with the serving cell may be different.

As shown in the example of FIG. 4A, an SSB 405 and a first downlink channel 410 may overlap in time. Using the techniques described herein, the UE 115 may determine SSB 405 and first downlink channel 410 are QCLed with a same 'TypeD' (e.g., same receive beam can be used for receiving and processing SSB and first downlink channel 410). For example, the UE 115 may assume this QCL relationship between both SSB 405 and first downlink channel 410 based on SSB 405 and first downlink channel 410 being associated with a same cell (e.g., a same serving cell or a same non-serving cell). In some examples, the UE 115 may determine that SSB 405 and first downlink channel 410 are associated with the same cell based on same PCI values being configured or associated with each message or signal, CORESET pool index values that correspond to same PCI values or same cells, etc.

Additionally or alternatively, in the example of FIG. 4B, SSB 405 may overlap in time with first downlink channel 410 and a second downlink channel 415.

Accordingly, the UE 115 may determine that SSB 405 and first downlink channel 410 are QCLed with a same 'TypeD' based on SSB 405 and first downlink channel being associated with a same cell and may not assume any QCL relationship between SSB 405 and second downlink channel 415 based on SSB 405 and second downlink channel 415 being associated with different cells (e.g., based on different PCI values for each or a CORESET pool index value for second downlink channel 415 corresponding to a different cell than the cell configured or associated with SSB 405).

In the example of FIG. 4C, SSB 405 may overlap in time with second downlink channel 415 alone, where SSB 405 is associated with a first cell (e.g., serving cell) and second downlink channel 415 is associated with a second cell different than the first cell (e.g., a non-serving cell). In some examples, the UE 115 may determine that SSB 405 and second downlink channel 415 are associated with different cells based on different PCI values being configured or associated with each message or signal, CORESET pool index values that correspond to different PCI values or different cells, etc. Accordingly, the UE 115 may not assume any QCL relationship between SSB 405 and second downlink channel 415 based on SSB 405 and second downlink channel 415 being associated with different cells.

FIGS. 5A, 5B, and 5C illustrate examples of a multi-beam overlapping configuration 500, a multi-beam overlapping configuration 501, and a multi-beam overlapping configuration 502, respectively, that support QCL determination for overlapping downlink channels and synchronization blocks in accordance with aspects of the present disclosure. Multi-beam overlapping configuration 500, multi-beam overlapping configuration 501, and multi-beam overlapping configuration 502 may implement aspects of or may be implemented by aspects of wireless communications system 100, wireless communications system 200, or both. For example, a UE 115 may determine a QCL relationship between one or more SSBs and one or more downlink channels that overlap in time with the one or more SSBs as shown in one of the multi-beam overlapping configurations based on the techniques described herein when the UE 115 is capable of receiving two beams simultaneously. Additionally, in multi-beam overlapping configuration 500, multi-beam overlapping configuration 501, and multi-beam overlapping configuration 502, SSBs associated with a serving cell PCI and SSBs associated with non-serving cell PCIs may be time-overlapping If one downlink channel overlaps with two (2) SSBs, a first SSB 505 associated with a serving cell PCI and a second SSB 510 associated with a non-serving cell PCI, a QCL-TypeD assumption for the one downlink channel depends on whether the one downlink channel is associated with the serving cell PCI or the non-serving cell PCI. For example, as shown in the example of FIG. 5A, if a first downlink channel 515 is associated with the serving cell PCI (e.g., and/or associated with a CORESRT pool index value of '0'), the UE 115 may assume first downlink channel 515 follows QCL-TypeD of first SSB 505 (e.g., the serving cell SSB). Additionally or alternatively, as shown in the example of FIG. 5B, if a second downlink channel 520 is associated with the non-serving cell PCI (e.g., and/or associated with a CORESRT pool index value of '1'), the UE 115 may assume second downlink channel 520 follows QCL-TypeD of second SSB 510 (e.g., the non-serving cell SSB). Additionally or alternatively, if one downlink channel overlaps with two (2) SSBs, the UE 115 may expect the downlink channel to be associated with the serving cell PCI (e.g., and/or associated with a CORESRT pool index value of '0') and may assume a same QCL-TypeD as first SSB 505 (e.g., the serving cell SSB). That is, the UE 115 may expect that the one overlapping downlink channel should not be associated with the non-serving cell PCI (e.g., and/or associated with a CORESET pool index value of '1').

Additionally or alternatively, as shown in the example of FIG. 5C, first downlink channel 515 and second downlink channel 520 may overlap in time with first SSB 505 and second SSB 510 (e.g., with first SSB 505 still being associated with a serving cell PCI and second SSB 510 being associated with a non-serving cell PCI). Accordingly, the UE 115 may expect one of the downlink channels (e.g., first downlink channel 515) to be associated with the serving cell PCI (e.g., and/or associated with a CORESRT pool index value of '0') and may assume a same QCL-TypeD as first SSB 505 (e.g., the serving cell SSB). Additionally, the UE 115 may expect the other downlink channel (e.g., second downlink channel 520) to be associated with the non-serving cell PCI (e.g., and/or associated with a CORESET pool index value of '1') and may assume a same QCL-TypeD as second SSB 510 (e.g., the non-serving cell SSB).

Figure 6:
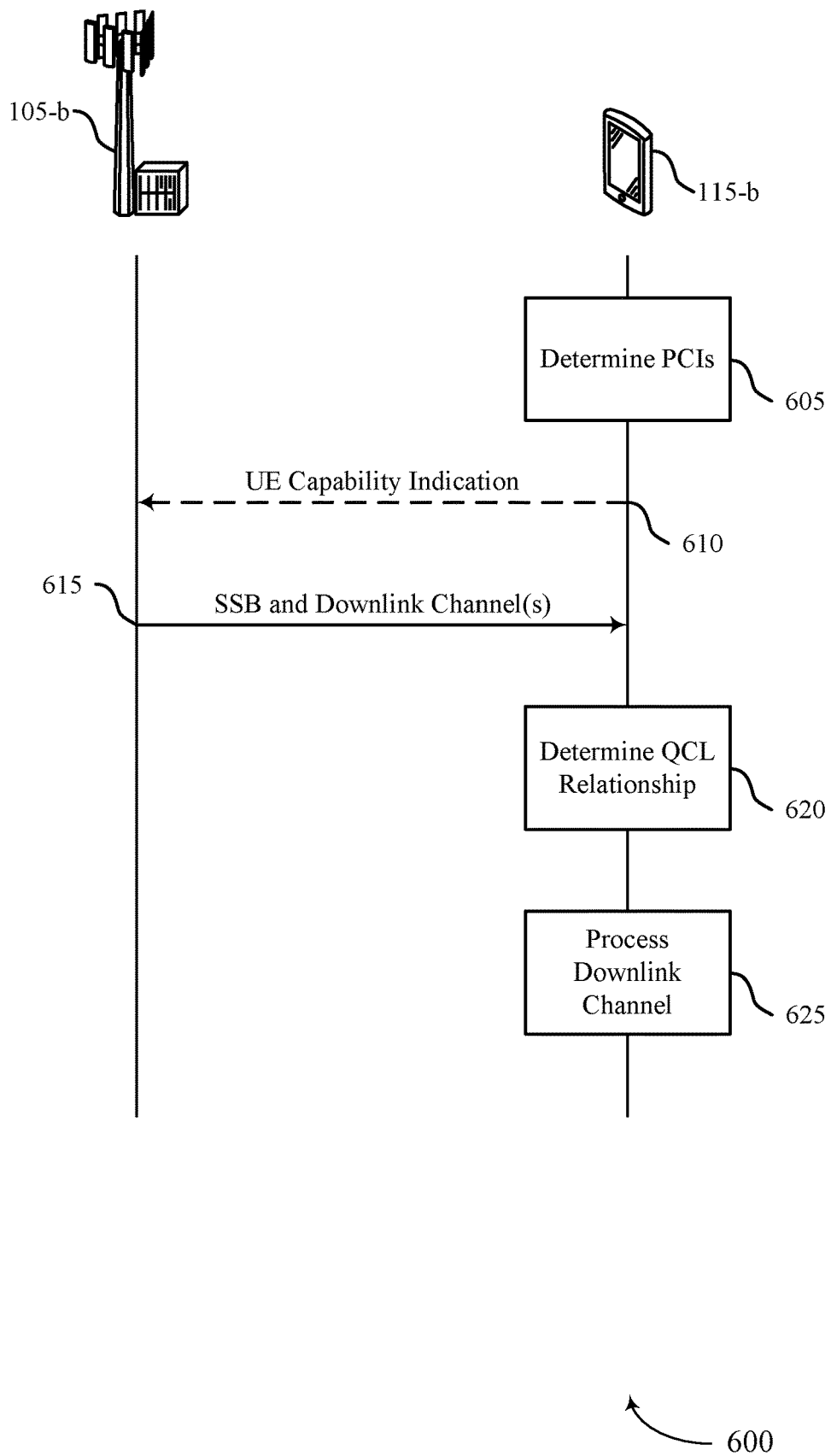
FIG. 6 illustrates an example of a process flow that supports QCL determination for overlapping downlink channels and synchronization blocks in accordance with aspects of the present disclosure.

FIG. 6 illustrates an example of a process flow 600 that supports QCL determination for overlapping downlink channels and synchronization blocks in accordance with aspects of the present disclosure. In some examples, process flow 600 may implement aspects of or may be implemented by aspects of wireless communications system 100, wireless communications system 200, or both. For example, process flow 600 may include a base station 105-*b* and a UE 115-*b*, which may represent examples of corresponding base stations 105 and UEs 115, respectively, as described with reference to FIGS. 1-5C.

In the following description of process flow 600, the operations between UE 115-*b* and base station 105-*b* may be performed in different orders or at different times. Certain operations may also be left out of process flow 600, or other operations may be added to process flow 600. It is to be understood that while UE 115-*b* and base station 105-*b* are shown performing a number of the operations of process flow 600, any wireless device may perform the operations shown.

At 605, UE 115-*b* may determine a first PCI corresponding to a serving cell configured for UE 115-*b* and a second PCI corresponding to a second cell configured for UE 115-*b* different than the serving cell (e.g., non-serving cell). For example, UE 115-*b* may determine the first PCI based on synchronization signaling (e.g., PSS, SSS, etc.) acquired from base station 105-*b* as part of an initial access procedure. Additionally, UE 115-*b* may determine the second PCI based on RRC signaling received from base station 105-*b* that indicates the second PCI. In some examples, the first PCI may be considered a serving cell PCI, and the second PCI may be considered a non-serving cell PCI. Additionally, the serving cell may be part of base station 105-*b*, and the second cell may be part of base station 105-*b* or an additional base station 105.

At 610, UE 115-*b* may transmit, to base station 105-*b*, an indication of a capability of UE 115-*b*. For example, the capability of UE 115-*b* may include a capability of receiving a single beam at a time, of receiving two beams simultaneously, or a combination thereof.

At 615, UE 115-*b* may receive an SSB associated with a PCI corresponding to the serving cell or the second cell. That is, the PCI may be the first PCI or the second PCI. Additionally, in some examples, the SSB may overlap in time with one or more downlink channels. For example, UE 115-*b* may determine a first downlink channel and a second downlink channel of the one or more downlink channels overlap in time with the SSB, where the first downlink channel is associated with the first PCI and the second downlink channel is associated with the second PCI. Additionally or alternatively, UE 115-*b* may receive a second SSB that is overlapping in time with the SSB. In some examples, the second SSB may include a separate PCI different than the PCI associated with the SSB. For example, the separate PCI associated with the second SSB may be the second PCI based on the PCI for the SSB being the first PCI, or the separate PCI associated with the SSB may be the first PCI based on the PCI for the SSB being the second PCI.

At 620, UE 115-*b* may determine a QCL relationship between the SSB and one or more downlink channels that are overlapping in time with the SSB based on the PCI. For example, UE 115-*b* may determine the QCL relationship between the SSB and DMRSs of the one or more downlink channels. In some examples, the QCL relationship may correspond to a same receive beam used to receive the SSB and the one or more downlink channels. Additionally, UE 115-*b* may determine the QCL relationship between the SSB and the one or more downlink channels that are overlapping in time with the SSB based on the capability of the UE transmitted in the indication at 610.

In some examples, UE 115-*b* may determine the QCL relationship between the SSB and the one or more downlink channels that are overlapping in time with the SSB based on the one or more downlink channels being associated with the PCI. Additionally or alternatively, the one or more downlink channels may include a CORESET pool index value associated with the PCI. In some examples, UE 115-*b* may determine the QCL relationship between the SSB and the one or more downlink channels that are overlapping in time with the SSB based on a number of downlink channels of the one or more downlink channels.

In some examples, UE 115-*b* may determine the first downlink channel is associated with at least two (2) TCI states, where the QCL relationship is determined based on the at least two TCI states. For example, a first TCI state of the at least two TCI states may be determined for the QCL relationship between the SSB and the first downlink channel. Additionally or alternatively, UE 115-*b* may determine the first downlink channel overlaps in time with the SSB and a second SSB and may determine a first QCL relationship between the first downlink channel and the SSB and a second QCL relationship between the first downlink channel and the second SSB. In some examples, the first QCL relationship may be based on a first TCI state of the at least two TCI states, and the second QCL relationship may be based on a second TCI state of the at least two TCI states.

At 625, UE 115-*b* may process a first downlink channel of the one or more downlink channels based on the QCL relationship. In some examples, UE 115-*b* may determine a second QCL relationship between a second SSB and a second downlink channel of the one or more downlink channels based on the second SSB and the second downlink channel being associated with a separate PCI. Subsequently, UE 115-*b* may process the second downlink channel based on the second QCL relationship.

Figure 7:
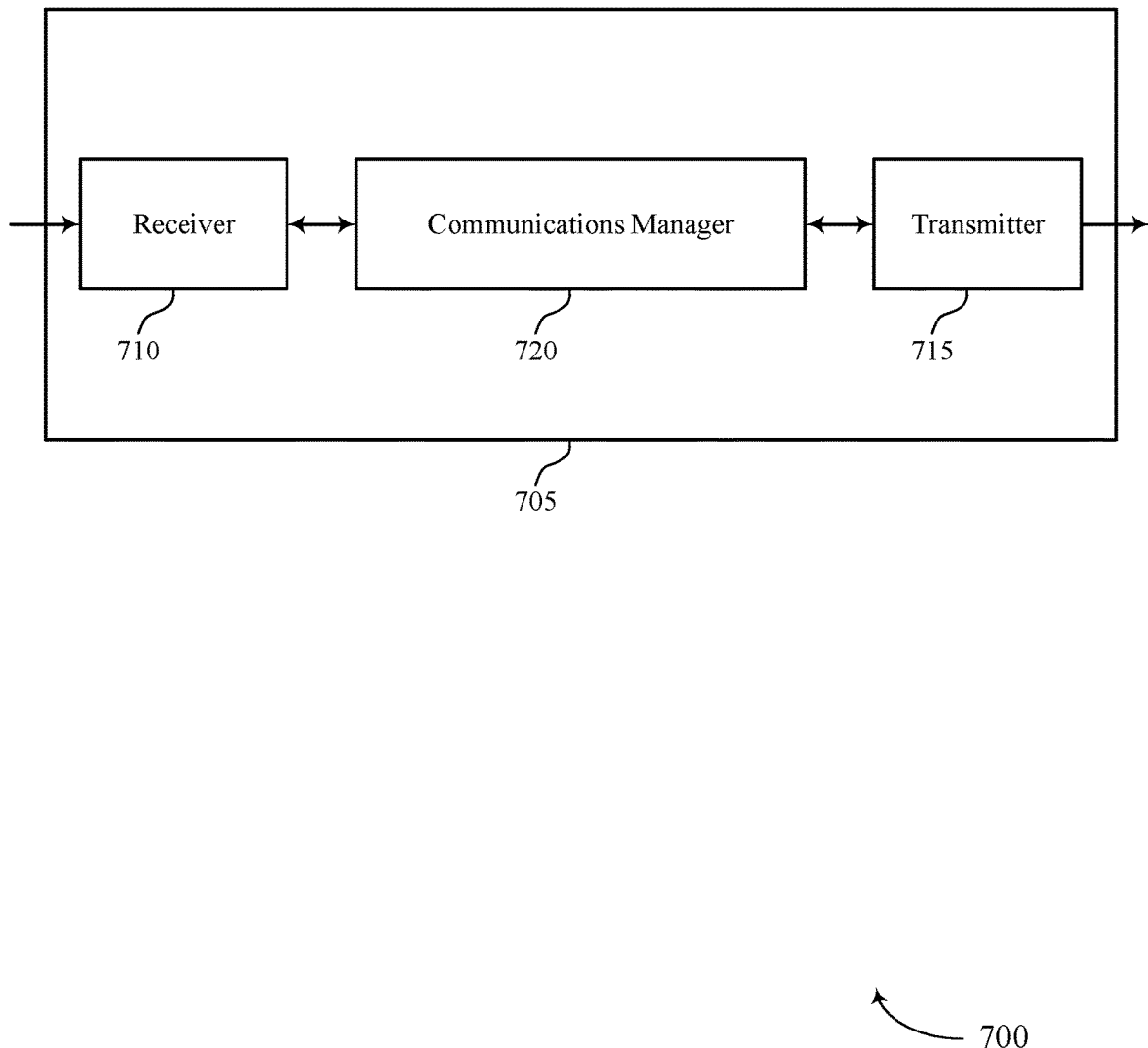
FIGS. 7 and 8 show block diagrams of devices that support QCL determination for overlapping downlink channels and synchronization blocks in accordance with aspects of the present disclosure.

FIG. 7 shows a block diagram 700 of a device 705 that supports QCL determination for overlapping downlink channels and synchronization blocks in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to QCL determination for overlapping downlink channels and synchronization blocks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to QCL determination for overlapping downlink channels and synchronization blocks). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of QCL determination for overlapping downlink channels and synchronization blocks as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for determining a first PCI corresponding to a serving cell configured for the UE and a second PCI corresponding to a second cell configured for the UE different than the serving cell. The communications manager 720 may be configured as or otherwise support a means for receiving a SSB associated with a PCI corresponding to the serving cell or the second cell, the PCI including the first PCI or the second PCI. The communications manager 720 may be configured as or otherwise support a means for determining a QCL relationship between the SSB and one or more downlink channels that are overlapping in time with the SSB based on the PCI. The communications manager 720 may be configured as or otherwise support a means for processing a first downlink channel of the one or more downlink channels based on the QCL relationship.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources. For example, based on a determined QCL relationship between an SSB and a downlink channel, the device 705 may use information from receiving the SSB to receive and process the downlink channel without receiving or processing additional information for the downlink channel. As such, by leveraging QCL information for the SSB (e.g., such as a receive beam used for receiving the SSB), the device 705 may receive the downlink channel more efficiently with less processing specific to the downlink channel, reduced power consumption based on the reduced processing, and with a more efficient usage of communication resources by associating the SSB and the downlink channel together.

Figure 8:
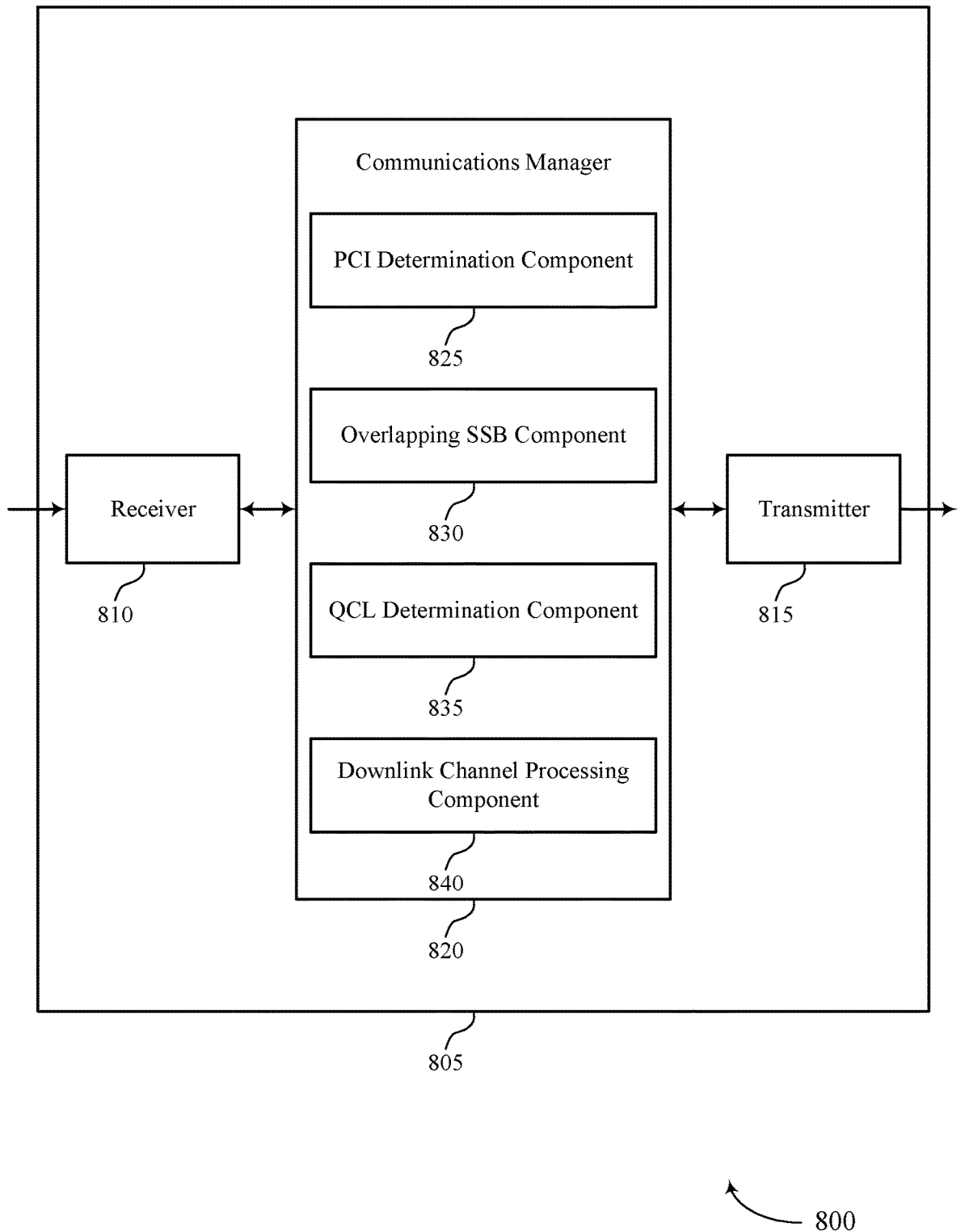

FIG. 8 shows a block diagram 800 of a device 805 that supports QCL determination for overlapping downlink channels and synchronization blocks in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to QCL determination for overlapping downlink channels and synchronization blocks). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to QCL determination for overlapping downlink channels and synchronization blocks). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of QCL determination for overlapping downlink channels and synchronization blocks as described herein. For example, the communications manager 820 may include a PCI determination component 825, an overlapping SSB component 830, a QCL determination component 835, a downlink channel processing component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The PCI determination component 825 may be configured as or otherwise support a means for determining a first PCI corresponding to a serving cell configured for the UE and a second PCI corresponding to a second cell configured for the UE different than the serving cell. The overlapping SSB component 830 may be configured as or otherwise support a means for receiving a SSB associated with a PCI corresponding to the serving cell or the second cell, the PCI including the first PCI or the second PCI. The QCL determination component 835 may be configured as or otherwise support a means for determining a QCL relationship between the SSB and one or more downlink channels that are overlapping in time with the SSB based on the PCI. The downlink channel processing component 840 may be configured as or otherwise support a means for processing a first downlink channel of the one or more downlink channels based on the QCL relationship.

Figure 9:
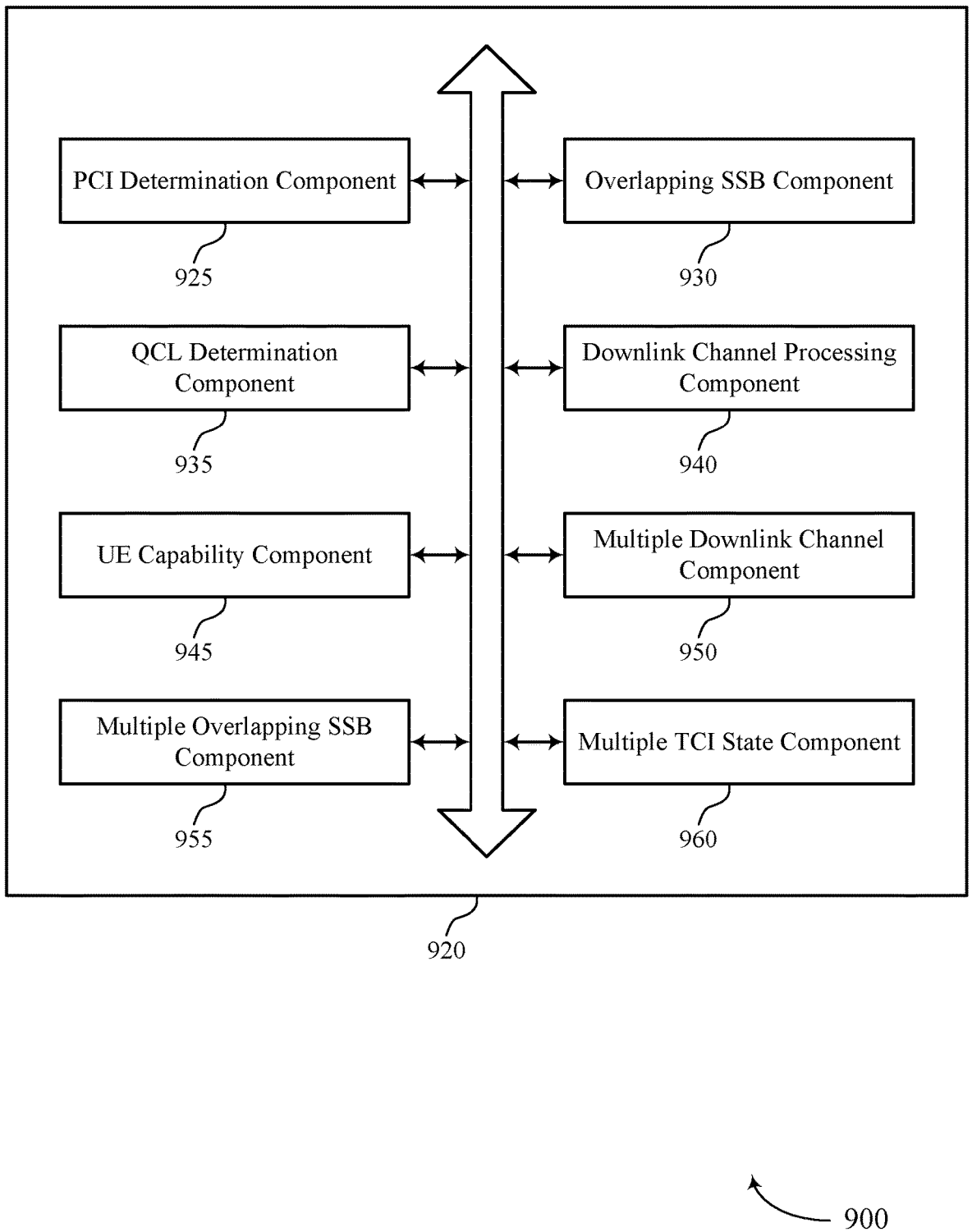
FIG. 9 shows a block diagram of a communications manager that supports QCL determination for overlapping downlink channels and synchronization blocks in accordance with aspects of the present disclosure.

FIG. 9 shows a block diagram 900 of a communications manager 920 that supports QCL determination for overlapping downlink channels and synchronization blocks in accordance with aspects of the present disclosure. The communications manager 920 may be an example of aspects of a communications manager 720, a communications manager 820, or both, as described herein. The communications manager 920, or various components thereof, may be an example of means for performing various aspects of QCL determination for overlapping downlink channels and synchronization blocks as described herein. For example, the communications manager 920 may include a PCI determination component 925, an overlapping SSB component 930, a QCL determination component 935, a downlink channel processing component 940, a UE capability component 945, a multiple downlink channel component 950, a multiple overlapping SSB component 955, a multiple TCI state component 960, or any combination thereof. Each of these components may communicate, directly or indirectly, with one another (e.g., via one or more buses).

The communications manager 920 may support wireless communications at a UE in accordance with examples as disclosed herein. The PCI determination component 925 may be configured as or otherwise support a means for determining a first PCI corresponding to a serving cell configured for the UE and a second PCI corresponding to a second cell configured for the UE different than the serving cell. The overlapping SSB component 930 may be configured as or otherwise support a means for receiving a SSB associated with a PCI corresponding to the serving cell or the second cell, the PCI including the first PCI or the second PCI. The QCL determination component 935 may be configured as or otherwise support a means for determining a QCL relationship between the SSB and one or more downlink channels that are overlapping in time with the SSB based on the PCI. The downlink channel processing component 940 may be configured as or otherwise support a means for processing a first downlink channel of the one or more downlink channels based on the QCL relationship.

In some examples, to support determining the QCL relationship, the UE capability component 945 may be configured as or otherwise support a means for determining the QCL relationship between the SSB and the one or more downlink channels that are overlapping in time with the SSB based on a capability of the UE.

In some examples, the UE capability component 945 may be configured as or otherwise support a means for transmitting, to the base station, an indication of the capability of the UE, where the QCL relationship is determined based on the indication of the capability of the UE.

In some examples, the capability of the UE includes a capability of receiving a single beam at a time, of receiving two beams simultaneously, or a combination thereof.

In some examples, to support determining the QCL relationship, the QCL determination component 935 may be configured as or otherwise support a means for determining the QCL relationship between the SSB and demodulation reference signals of the one or more downlink channels.

In some examples, to support determining the QCL relationship, the QCL determination component 935 may be configured as or otherwise support a means for determining the QCL relationship between the SSB and the one or more downlink channels that are overlapping in time with the SSB based on the one or more downlink channels being associated with the PCI.

In some examples, the one or more downlink channels include a CORESET pool index value associated with the PCI.

In some examples, the multiple downlink channel component 950 may be configured as or otherwise support a means for determining the first downlink channel and a second downlink channel of the one or more downlink channels overlap in time with the SSB, where the first downlink channel is associated with the first PCI and the second downlink channel is associated with the second PCI.

In some examples, the multiple overlapping SSB component 955 may be configured as or otherwise support a means for receiving a second SSB that is overlapping in time with the SSB, the second SSB including a separate PCI different than the PCI, where the separate PCI includes the second PCI based on the PCI including the first PCI or the separate PCI includes the first PCI based on the PCI including the second PCI.

In some examples, the multiple overlapping SSB component 955 may be configured as or otherwise support a means for determining a second QCL relationship between the second SSB and a second downlink channel of the one or more downlink channels based on the second SSB and the second downlink channel being associated with the separate PCI. In some examples, the multiple overlapping SSB component 955 may be configured as or otherwise support a means for processing the second downlink channel based on the second QCL relationship.

In some examples, to support determining the QCL relationship, the QCL determination component 935 may be configured as or otherwise support a means for determining the QCL relationship between the SSB and the one or more downlink channels that are overlapping in time with the SSB based on a number of downlink channels of the one or more downlink channels.

In some examples, the multiple TCI state component 960 may be configured as or otherwise support a means for determining the first downlink channel is associated with at least two transmission configuration indicator states, where the QCL relationship is determined based on the at least two transmission configuration indicator states.

In some examples, a first transmission configuration indicator state of the at least two transmission configuration indicator states is determined for the QCL relationship between the SSB and the first downlink channel.

In some examples, the multiple TCI state component 960 may be configured as or otherwise support a means for determining the first downlink channel overlaps in time with the SSB and a second SSB. In some examples, the multiple TCI state component 960 may be configured as or otherwise support a means for determining a first QCL relationship between the first downlink channel and the SSB and a second QCL relationship between the first downlink channel and the second SSB, the first QCL relationship based on a first transmission configuration indicator state of the at least two transmission configuration indicator states and the second QCL relationship based on a second transmission configuration indicator state of the at least two transmission configuration indicator states.

In some examples, the first PCI includes a serving cell PCI.

In some examples, the second PCI includes a non-serving cell PCI.

In some examples, the serving cell is associated with the base station, and the second cell is associated with the base station or an additional base station.

In some examples, the QCL relationship corresponds to a same receive beam used to receive the SSB and the first downlink channel.

Figure 10:
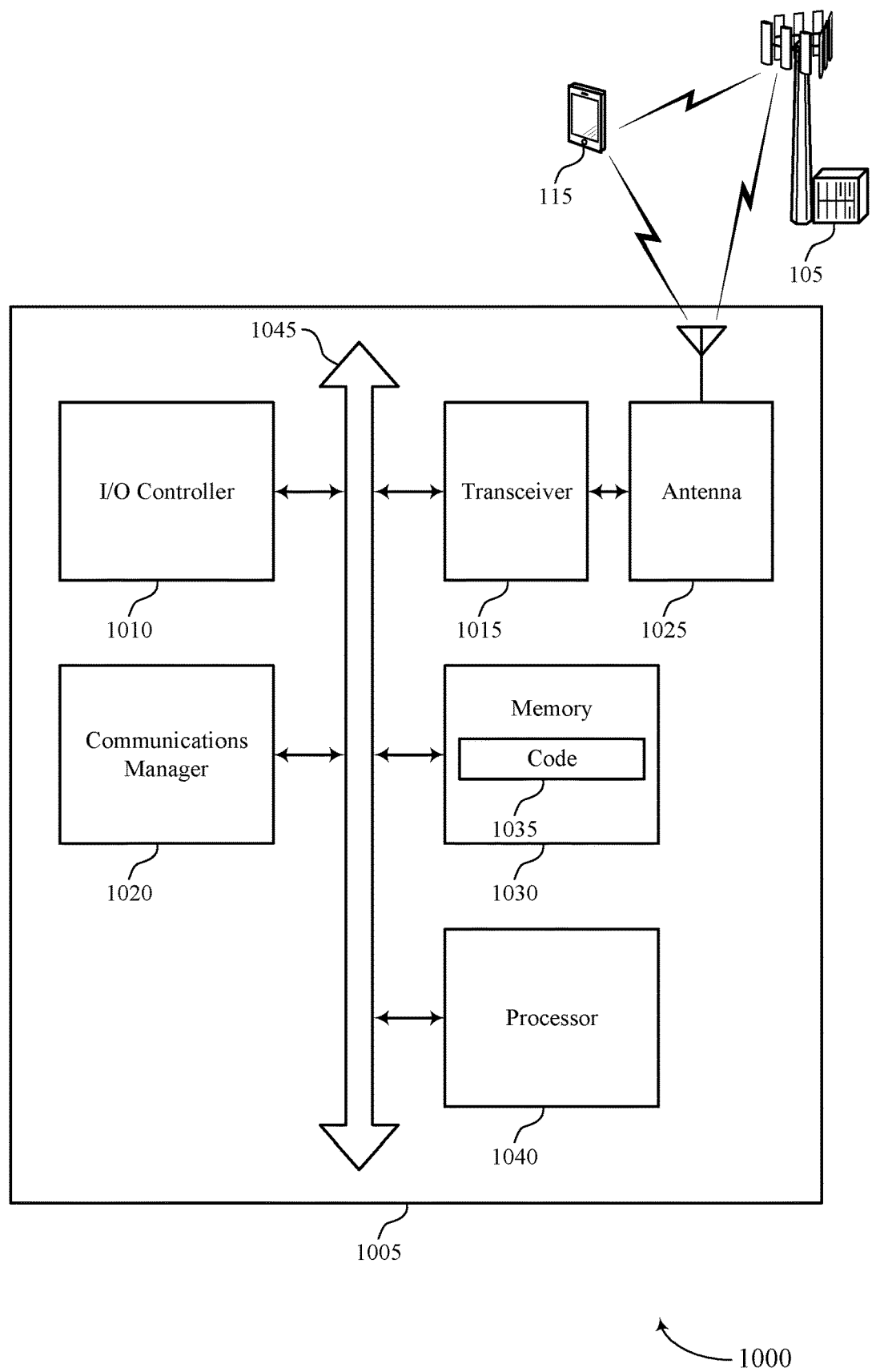
FIG. 10 shows a diagram of a system including a device that supports QCL determination for overlapping downlink channels and synchronization blocks in accordance with aspects of the present disclosure.

FIG. 10 shows a diagram of a system 1000 including a device 1005 that supports QCL determination for overlapping downlink channels and synchronization blocks in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting QCL determination for overlapping downlink channels and synchronization blocks). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for determining a first PCI corresponding to a serving cell configured for the UE and a second PCI corresponding to a second cell configured for the UE different than the serving cell. The communications manager 1020 may be configured as or otherwise support a means for receiving a SSB associated with a PCI corresponding to the serving cell or the second cell, the PCI including the first PCI or the second PCI. The communications manager 1020 may be configured as or otherwise support a means for determining a QCL relationship between the SSB and one or more downlink channels that are overlapping in time with the SSB based on the PCI. The communications manager 1020 may be configured as or otherwise support a means for processing a first downlink channel of the one or more downlink channels based on the QCL relationship.

By including or configuring the communications manager 1020 in accordance with examples as described herein, the device 1005 may support techniques for improved user experience related to reduced processing, reduced power consumption, improved coordination between devices, and improved utilization of processing capability. For example, based on a determined QCL relationship between an SSB and a downlink channel, the device 1005 may use information from receiving the SSB to receive and process the downlink channel without receiving or processing additional information specific to the downlink channel alone, thereby reducing processing and power consumption, improving coordination between the device 1005 and a transmitting device that transmits the SSB and the downlink channel according to the QCL relationship, and improving utilization of processing capabilities of the device 1005 to receive and process both the SSB and downlink channel that overlap in time.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of QCL determination for overlapping downlink channels and synchronization blocks as described herein, or the processor 1040 and the memory 1030 may be otherwise configured to perform or support such operations.

Figure 11:
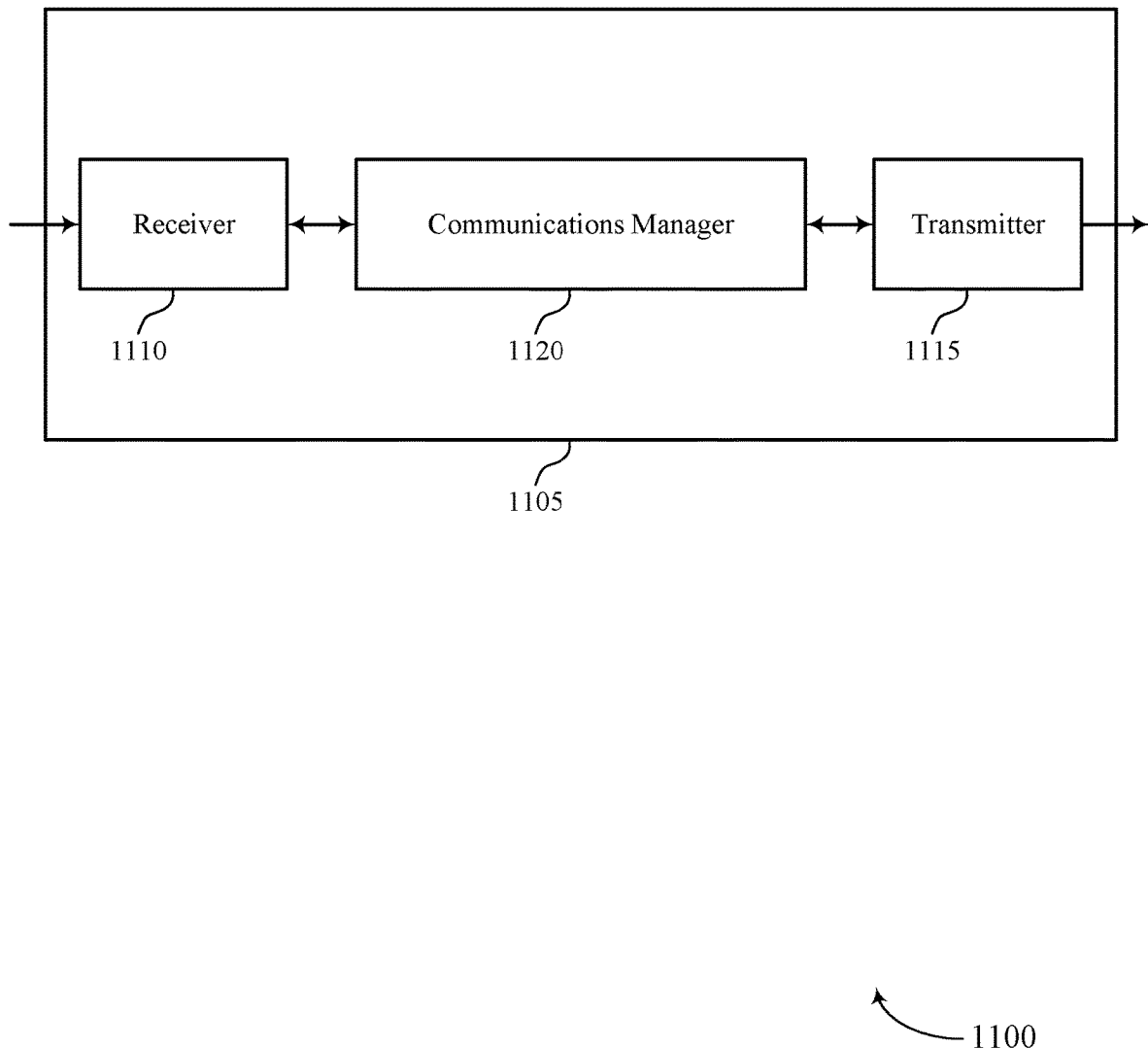
FIGS. 11 and 12 show block diagrams of devices that support QCL determination for overlapping downlink channels and synchronization blocks in accordance with aspects of the present disclosure.

FIG. 11 shows a block diagram 1100 of a device 1105 that supports QCL determination for overlapping downlink channels and synchronization blocks in accordance with aspects of the present disclosure. The device 1105 may be an example of a network entity implementing one or more aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to QCL determination for overlapping downlink channels and synchronization blocks). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to QCL determination for overlapping downlink channels and synchronization blocks). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of QCL determination for overlapping downlink channels and synchronization blocks as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network entity implementing one or more aspects of a base station in accordance with examples as disclosed herein. For example, the communications manager 1120 may be configured as or otherwise support a means for transmitting, to a UE, first signaling associated with a first PCI corresponding to a serving cell configured for the UE and second signaling including a second PCI corresponding to a second cell configured for the UE different than the serving cell. The communications manager 1120 may be configured as or otherwise support a means for receiving, from the UE, a capability message including an indication of one or more capabilities of the UE. The communications manager 1120 may be configured as or otherwise support a means for determining a QCL relationship between a SSB and a first downlink channel of one or more downlink channels based on the capability message. The communications manager 1120 may be configured as or otherwise support a means for transmitting, to the UE based on the QCL relationship, the SSB including a PCI corresponding to the serving cell or the second cell and the first downlink channel, the SSB and the first downlink channel overlapping in time and the PCI including the first PCI or the second PCI.

Figure 12:
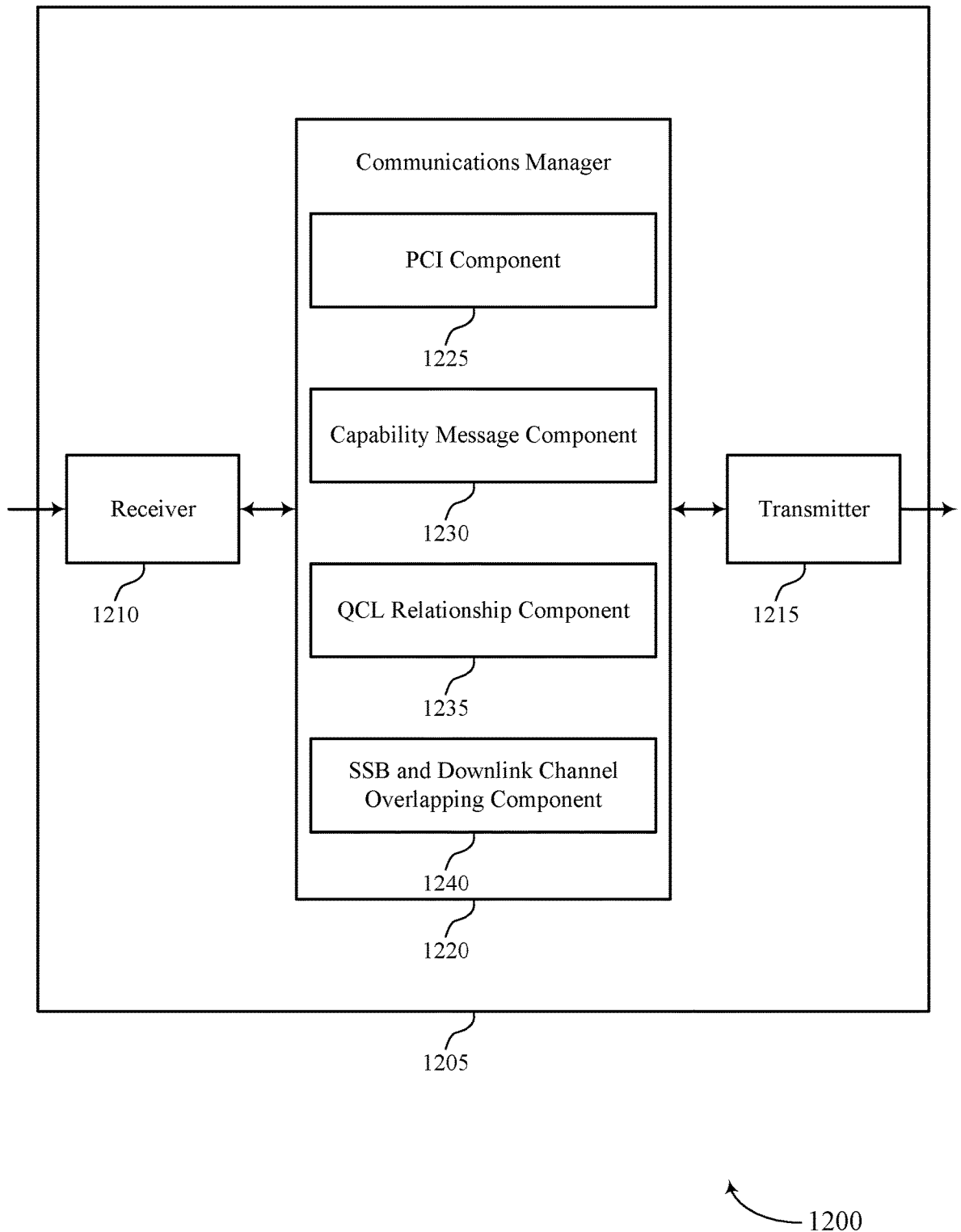

FIG. 12 shows a block diagram 1200 of a device 1205 that supports QCL determination for overlapping downlink channels and synchronization blocks in accordance with aspects of the present disclosure. The device 1205 may be an example of aspects of a device 1105 or one or more aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to QCL determination for overlapping downlink channels and synchronization blocks). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to QCL determination for overlapping downlink channels and synchronization blocks). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of QCL determination for overlapping downlink channels and synchronization blocks as described herein. For example, the communications manager 1220 may include a PCI component 1225, a capability message component 1230, a QCL relationship component 1235, an SSB and downlink channel overlapping component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network entity implementing one or more aspects of a base station in accordance with examples as disclosed herein. The PCI component 1225 may be configured as or otherwise support a means for transmitting, to a UE, first signaling associated with a first PCI corresponding to a serving cell configured for the UE and second signaling including a second PCI corresponding to a second cell configured for the UE different than the serving cell. The capability message component 1230 may be configured as or otherwise support a means for receiving, from the UE, a capability message including an indication of one or more capabilities of the UE. The QCL relationship component 1235 may be configured as or otherwise support a means for determining a QCL relationship between a SSB and a first downlink channel of one or more downlink channels based on the capability message. The SSB and downlink channel overlapping component 1240 may be configured as or otherwise support a means for transmitting, to the UE based on the QCL relationship, the SSB including a PCI corresponding to the serving cell or the second cell and the first downlink channel, the SSB and the first downlink channel overlapping in time and the PCI including the first PCI or the second PCI.

Figure 13:
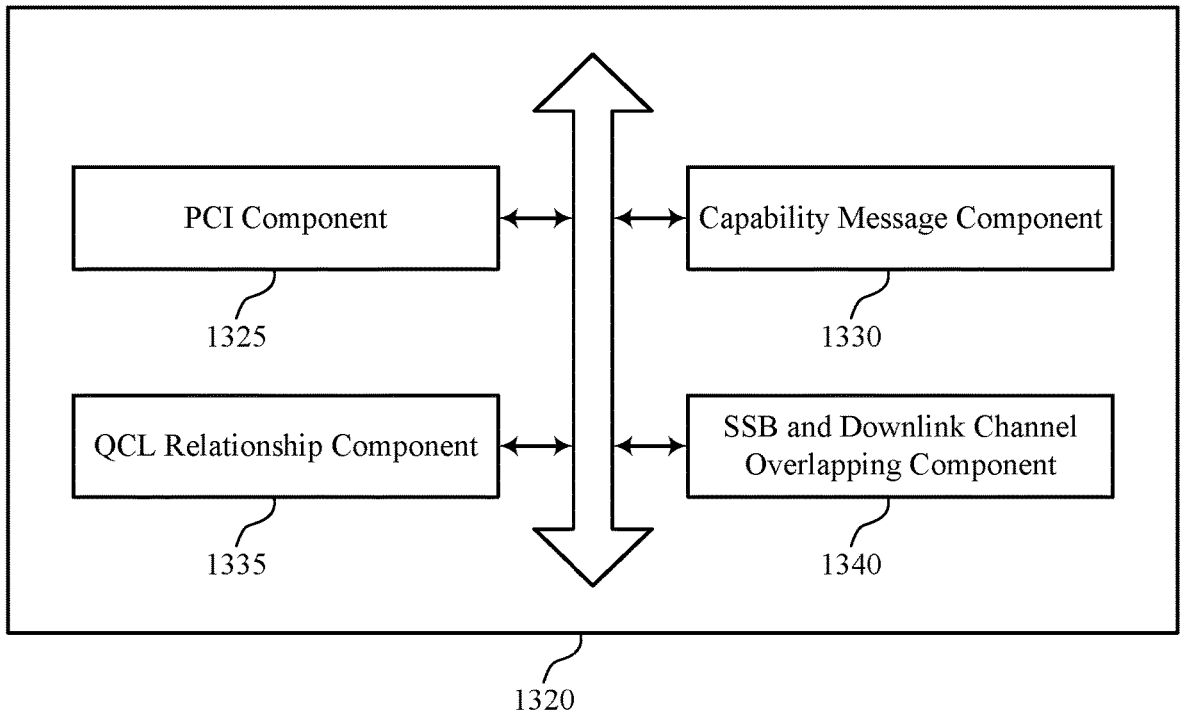
FIG. 13 shows a block diagram of a communications manager that supports QCL determination for overlapping downlink channels and synchronization blocks in accordance with aspects of the present disclosure.

FIG. 13 shows a block diagram 1300 of a communications manager 1320 that supports QCL determination for overlapping downlink channels and synchronization blocks in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of QCL determination for overlapping downlink channels and synchronization blocks as described herein. For example, the communications manager 1320 may include a PCI component 1325, a capability message component 1330, a QCL relationship component 1335, an SSB and downlink channel overlapping component 1340, or any combination thereof. Each of these components may communicate, directly or indirectly, with one another (e.g., via one or more buses).

The communications manager 1320 may support wireless communications at a network entity implementing one or more aspects of a base station in accordance with examples as disclosed herein. The PCI component 1325 may be configured as or otherwise support a means for transmitting, to a UE, first signaling associated with a first PCI corresponding to a serving cell configured for the UE and second signaling including a second PCI corresponding to a second cell configured for the UE different than the serving cell. The capability message component 1330 may be configured as or otherwise support a means for receiving, from the UE, a capability message including an indication of one or more capabilities of the UE. The QCL relationship component 1335 may be configured as or otherwise support a means for determining a QCL relationship between a SSB and a first downlink channel of one or more downlink channels based on the capability message. The SSB and downlink channel overlapping component 1340 may be configured as or otherwise support a means for transmitting, to the UE based on the QCL relationship, the SSB including a PCI corresponding to the serving cell or the second cell and the first downlink channel, the SSB and the first downlink channel overlapping in time and the PCI including the first PCI or the second PCI.

In some examples, the QCL relationship component 1335 may be configured as or otherwise support a means for determining the QCL relationship between the SSB and the first downlink channel based on the first downlink channel being associated with the PCI.

In some examples, the first downlink channel includes a CORESET pool index value associated with the PCI.

In some examples, the first PCI includes a serving cell PCI.

In some examples, the second PCI includes a non-serving cell PCI.

In some examples, the serving cell is associated with the network entity implementing one or more aspects of the base station, and the second cell is associated with the network entity implementing one or more aspects of the base station or an additional network entity or base station.

In some examples, the QCL relationship corresponds to a same receive beam used by the UE to receive the SSB and the first downlink channel.

In some examples, the one or more capabilities of the UE include a capability of receiving a single beam at a time, of receiving two beams simultaneously, or a combination thereof.

Figure 14:
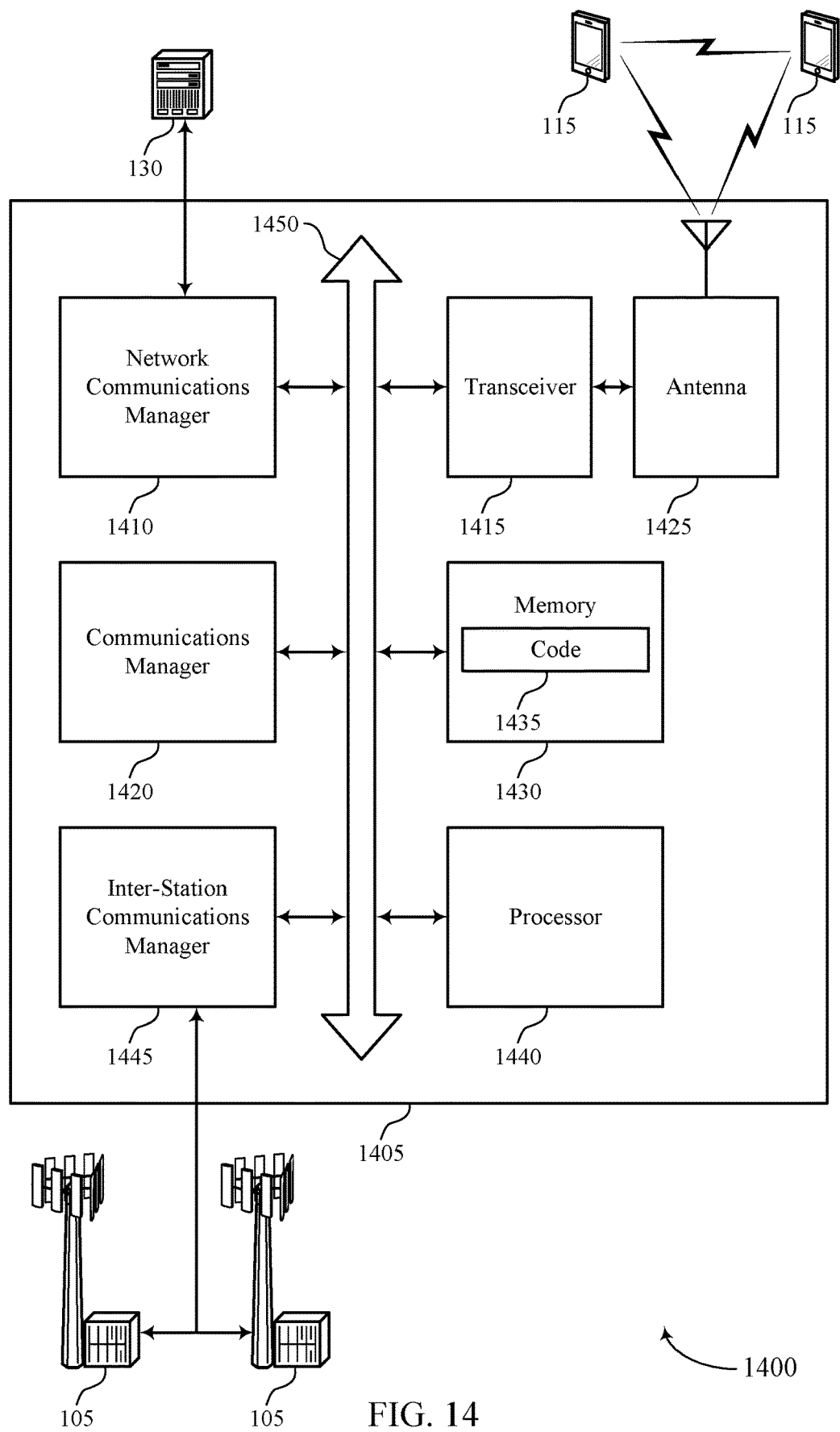
FIG. 14 shows a diagram of a system including a device that supports QCL determination for overlapping downlink channels and synchronization blocks in accordance with aspects of the present disclosure.

FIG. 14 shows a diagram of a system 1400 including a device 1405 that supports QCL determination for overlapping downlink channels and synchronization blocks in accordance with aspects of the present disclosure. The device 1405 may be an example of or include the components of a device 1105, a device 1205, or a network entity implementing one or more aspects of a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting QCL determination for overlapping downlink channels and synchronization blocks). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a network entity implementing one or more aspects of a base station in accordance with examples as disclosed herein. For example, the communications manager 1420 may be configured as or otherwise support a means for transmitting, to a UE, first signaling associated with a first PCI corresponding to a serving cell configured for the UE and second signaling including a second PCI corresponding to a second cell configured for the UE different than the serving cell. The communications manager 1420 may be configured as or otherwise support a means for receiving, from the UE, a capability message including an indication of one or more capabilities of the UE. The communications manager 1420 may be configured as or otherwise support a means for determining a QCL relationship between a SSB and a first downlink channel of one or more downlink channels based on the capability message. The communications manager 1420 may be configured as or otherwise support a means for transmitting, to the UE based on the QCL relationship, the SSB including a PCI corresponding to the serving cell or the second cell and the first downlink channel, the SSB and the first downlink channel overlapping in time and the PCI including the first PCI or the second PCI.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of QCL determination for overlapping downlink channels and synchronization blocks as described herein, or the processor 1440 and the memory 1430 may be otherwise configured to perform or support such operations.

Figure 15:
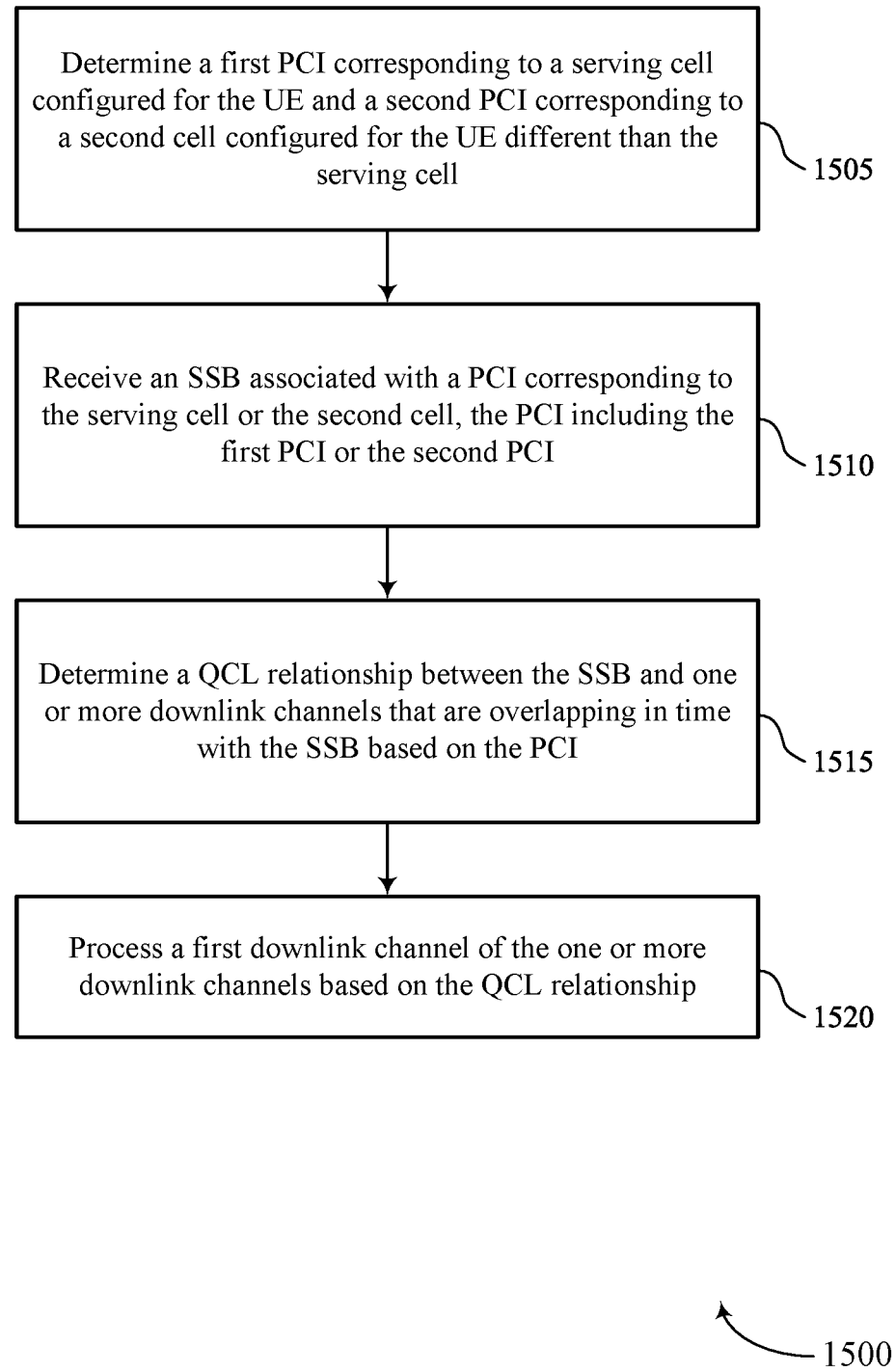
FIGS. 15 through 19 show flowcharts illustrating methods that support QCL determination for overlapping downlink channels and synchronization blocks in accordance with aspects of the present disclosure.

FIG. 15 shows a flowchart illustrating a method 1500 that supports QCL determination for overlapping downlink channels and synchronization blocks in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include determining a first PCI corresponding to a serving cell configured for the UE and a second PCI corresponding to a second cell configured for the UE different than the serving cell. The operations of 1505 may be performed in accordance with examples as disclosed herein. In some examples, aspects of the operations of 1505 may be performed by a PCI determination component 925 as described with reference to FIG. 9.

At 1510, the method may include receiving a SSB associated with a PCI corresponding to the serving cell or the second cell, the PCI including the first PCI or the second PCI. The operations of 1510 may be performed in accordance with examples as disclosed herein. In some examples, aspects of the operations of 1510 may be performed by an overlapping SSB component 930 as described with reference to FIG. 9.

At 1515, the method may include determining a QCL relationship between the SSB and one or more downlink channels that are overlapping in time with the SSB based on the PCI. The operations of 1515 may be performed in accordance with examples as disclosed herein. In some examples, aspects of the operations of 1515 may be performed by a QCL determination component 935 as described with reference to FIG. 9.

At 1520, the method may include processing a first downlink channel of the one or more downlink channels based on the QCL relationship. The operations of 1520 may be performed in accordance with examples as disclosed herein. In some examples, aspects of the operations of 1520 may be performed by a downlink channel processing component 940 as described with reference to FIG. 9.

Figure 16:
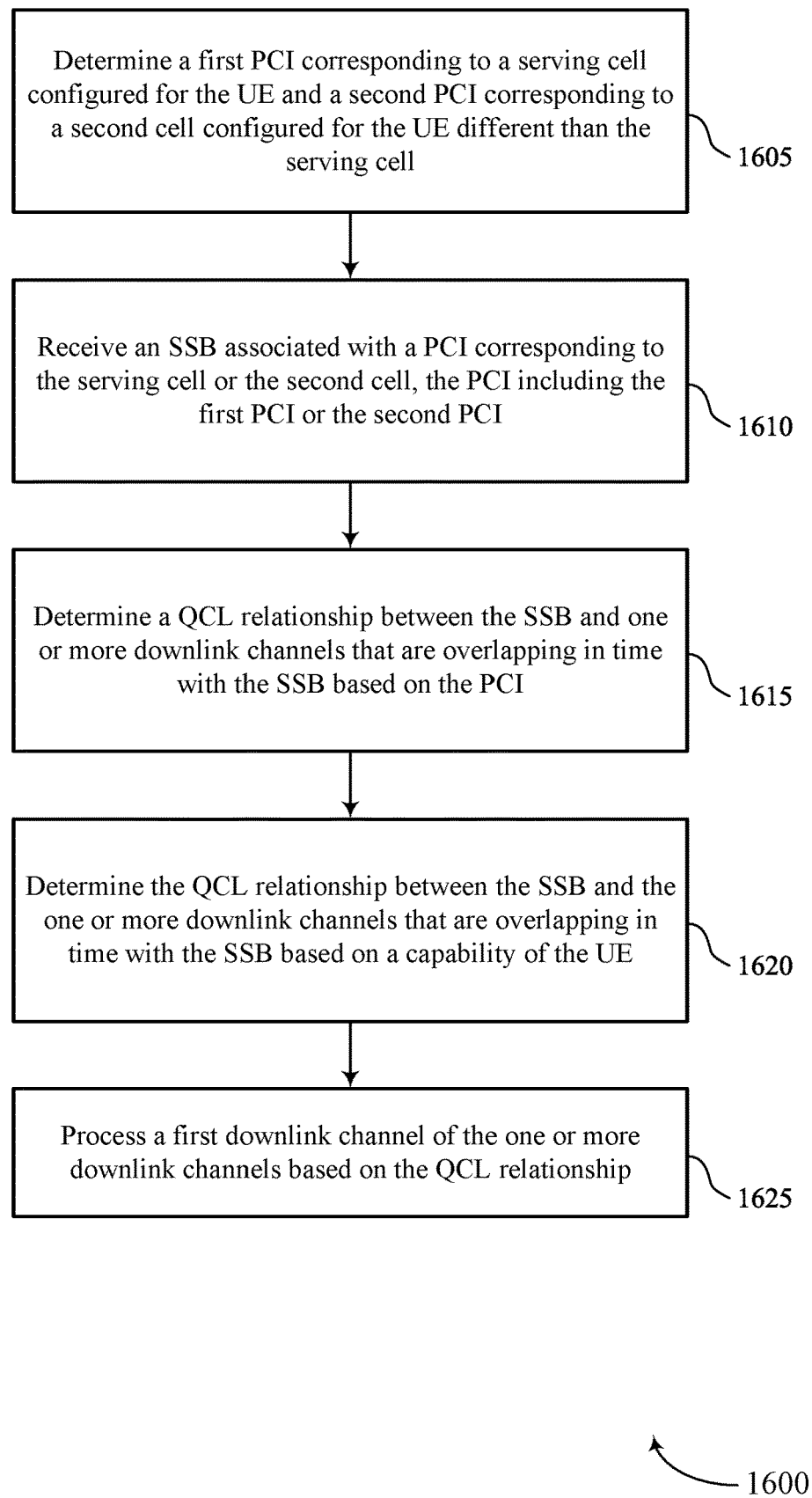

FIG. 16 shows a flowchart illustrating a method 1600 that supports QCL determination for overlapping downlink channels and synchronization blocks in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include determining a first PCI corresponding to a serving cell configured for the UE and a second PCI corresponding to a second cell configured for the UE different than the serving cell. The operations of 1605 may be performed in accordance with examples as disclosed herein. In some examples, aspects of the operations of 1605 may be performed by a PCI determination component 925 as described with reference to FIG. 9.

At 1610, the method may include receiving a SSB associated with a PCI corresponding to the serving cell or the second cell, the PCI including the first PCI or the second PCI. The operations of 1610 may be performed in accordance with examples as disclosed herein. In some examples, aspects of the operations of 1610 may be performed by an overlapping SSB component 930 as described with reference to FIG. 9.

At 1615, the method may include determining a QCL relationship between the SSB and one or more downlink channels that are overlapping in time with the SSB based on the PCI. The operations of 1615 may be performed in accordance with examples as disclosed herein. In some examples, aspects of the operations of 1615 may be performed by a QCL determination component 935 as described with reference to FIG. 9.

At 1620, the method may include determining the QCL relationship between the SSB and the one or more downlink channels that are overlapping in time with the SSB based on a capability of the UE. The operations of 1620 may be performed in accordance with examples as disclosed herein. In some examples, aspects of the operations of 1620 may be performed by a UE capability component 945 as described with reference to FIG. 9.

At 1625, the method may include processing a first downlink channel of the one or more downlink channels based on the QCL relationship. The operations of 1625 may be performed in accordance with examples as disclosed herein. In some examples, aspects of the operations of 1625 may be performed by a downlink channel processing component 940 as described with reference to FIG. 9.

Figure 17:
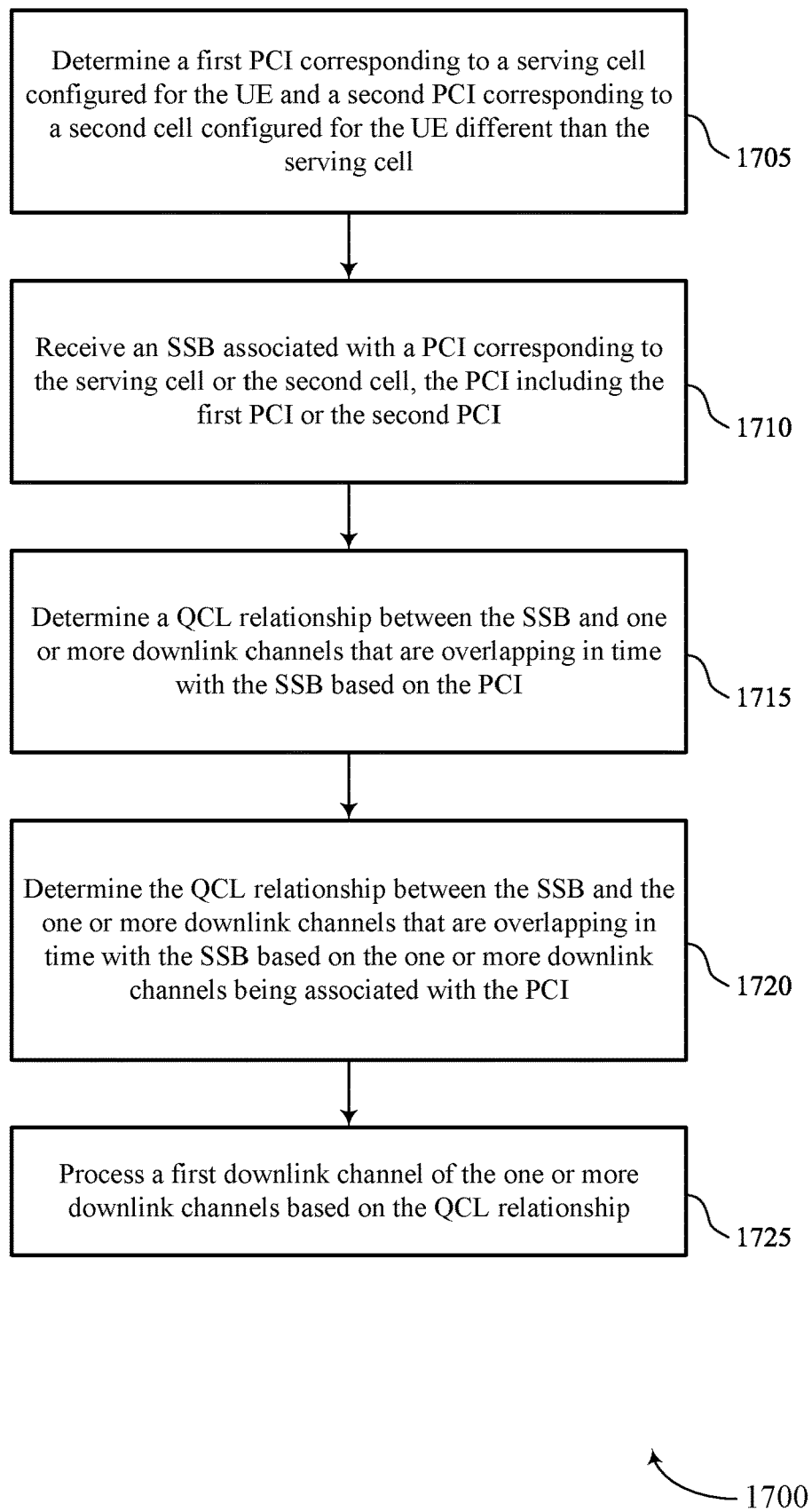

FIG. 17 shows a flowchart illustrating a method 1700 that supports QCL determination for overlapping downlink channels and synchronization blocks in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include determining a first PCI corresponding to a serving cell configured for the UE and a second PCI corresponding to a second cell configured for the UE different than the serving cell. The operations of 1705 may be performed in accordance with examples as disclosed herein. In some examples, aspects of the operations of 1705 may be performed by a PCI determination component 925 as described with reference to FIG. 9.

At 1710, the method may include receiving a SSB associated with a PCI corresponding to the serving cell or the second cell, the PCI including the first PCI or the second PCI. The operations of 1710 may be performed in accordance with examples as disclosed herein. In some examples, aspects of the operations of 1710 may be performed by an overlapping SSB component 930 as described with reference to FIG. 9.

At 1715, the method may include determining a QCL relationship between the SSB and one or more downlink channels that are overlapping in time with the SSB based on the PCI. The operations of 1715 may be performed in accordance with examples as disclosed herein. In some examples, aspects of the operations of 1715 may be performed by a QCL determination component 935 as described with reference to FIG. 9.

At 1720, the method may include determining the QCL relationship between the SSB and the one or more downlink channels that are overlapping in time with the SSB based on the one or more downlink channels being associated with the PCI. The operations of 1720 may be performed in accordance with examples as disclosed herein. In some examples, aspects of the operations of 1720 may be performed by a QCL determination component 935 as described with reference to FIG. 9.

At 1725, the method may include processing a first downlink channel of the one or more downlink channels based on the QCL relationship. The operations of 1725 may be performed in accordance with examples as disclosed herein. In some examples, aspects of the operations of 1725 may be performed by a downlink channel processing component 940 as described with reference to FIG. 9.

Figure 18:
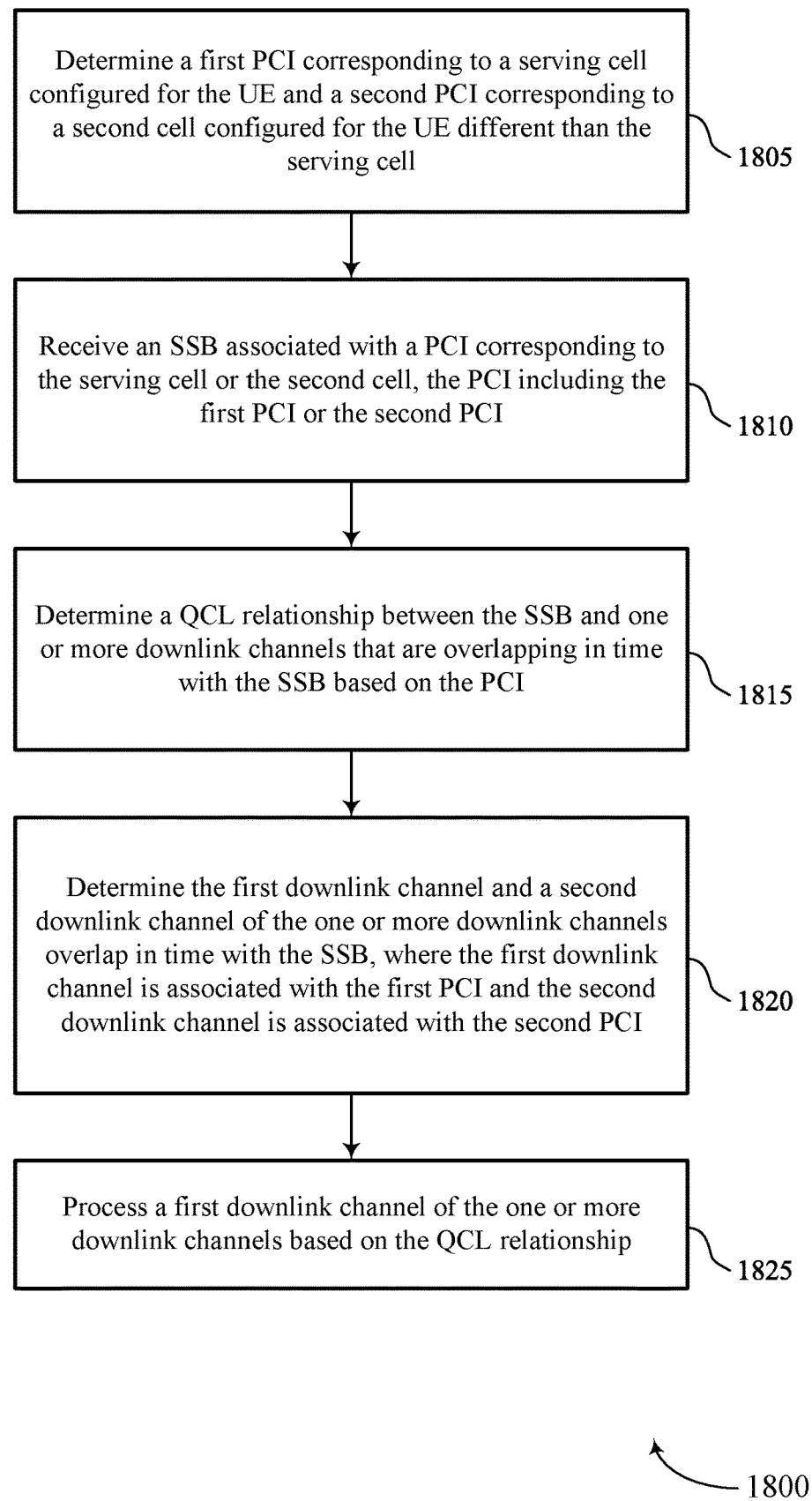

FIG. 18 shows a flowchart illustrating a method 1800 that supports QCL determination for overlapping downlink channels and synchronization blocks in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include determining a first PCI corresponding to a serving cell configured for the UE and a second PCI corresponding to a second cell configured for the UE different than the serving cell. The operations of 1805 may be performed in accordance with examples as disclosed herein. In some examples, aspects of the operations of 1805 may be performed by a PCI determination component 925 as described with reference to FIG. 9.

At 1810, the method may include receiving a SSB associated with a PCI corresponding to the serving cell or the second cell, the PCI including the first PCI or the second PCI. The operations of 1810 may be performed in accordance with examples as disclosed herein. In some examples, aspects of the operations of 1810 may be performed by an overlapping SSB component 930 as described with reference to FIG. 9.

At 1815, the method may include determining a QCL relationship between the SSB and one or more downlink channels that are overlapping in time with the SSB based on the PCI. The operations of 1815 may be performed in accordance with examples as disclosed herein. In some examples, aspects of the operations of 1815 may be performed by a QCL determination component 935 as described with reference to FIG. 9.

At 1820, the method may include determining the first downlink channel and a second downlink channel of the one or more downlink channels overlap in time with the SSB, where the first downlink channel is associated with the first PCI and the second downlink channel is associated with the second PCI. The operations of 1820 may be performed in accordance with examples as disclosed herein. In some examples, aspects of the operations of 1820 may be performed by a multiple downlink channel component 950 as described with reference to FIG. 9.

At 1825, the method may include processing a first downlink channel of the one or more downlink channels based on the QCL relationship. The operations of 1825 may be performed in accordance with examples as disclosed herein. In some examples, aspects of the operations of 1825 may be performed by a downlink channel processing component 940 as described with reference to FIG. 9.

Figure 19:
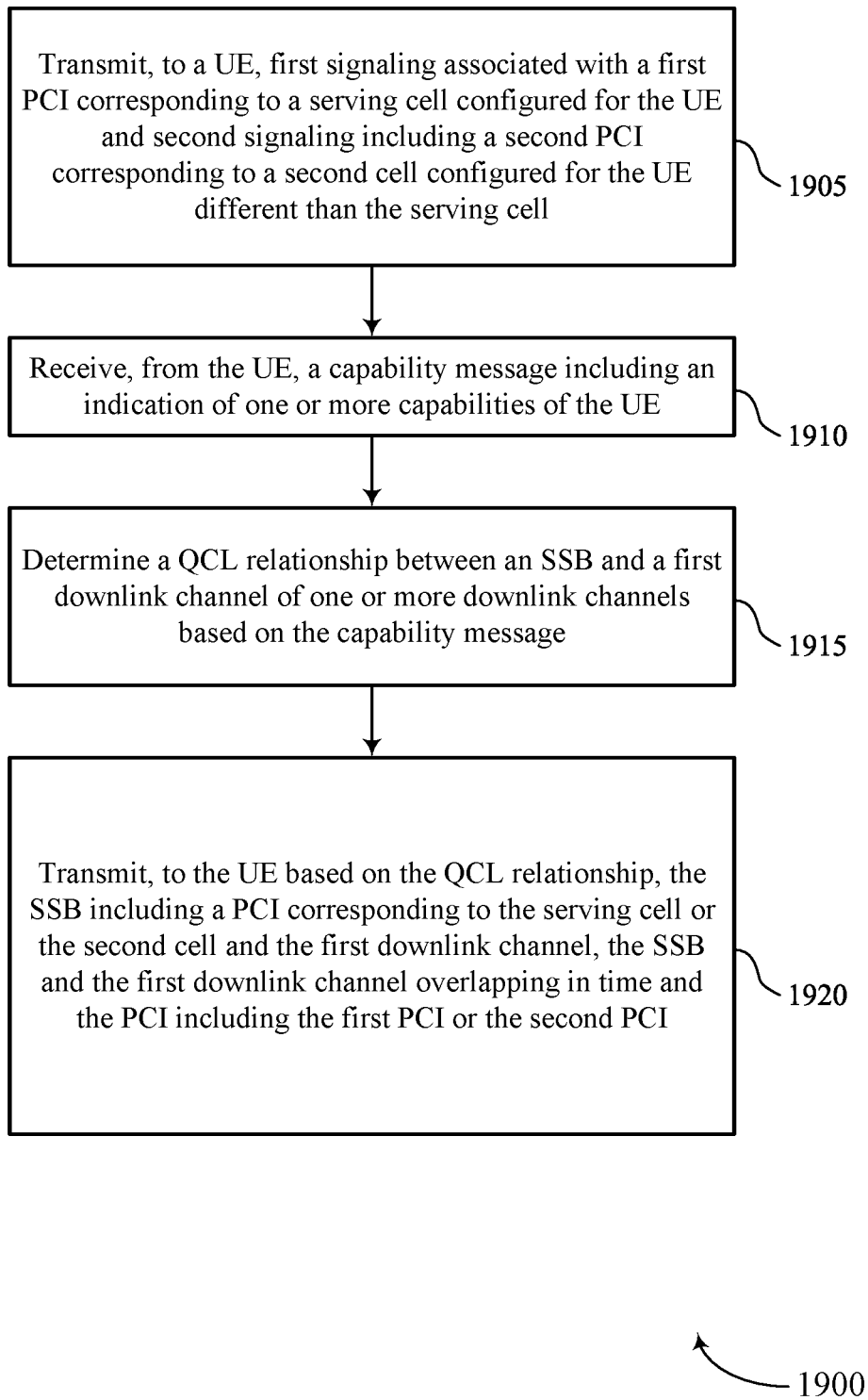

FIG. 19 shows a flowchart illustrating a method 1900 that supports QCL determination for overlapping downlink channels and synchronization blocks in accordance with aspects of the present disclosure. The operations of the method 1900 may be implemented by a network entity implementing one or more aspects of a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, first signaling associated with a first PCI corresponding to a serving cell configured for the UE and second signaling including a second PCI corresponding to a second cell configured for the UE different than the serving cell. The operations of 1905 may be performed in accordance with examples as disclosed herein. In some examples, aspects of the operations of 1905 may be performed by a PCI component 1325 as described with reference to FIG. 13.

At 1910, the method may include receiving, from the UE, a capability message including an indication of one or more capabilities of the UE. The operations of 1910 may be performed in accordance with examples as disclosed herein. In some examples, aspects of the operations of 1910 may be performed by a capability message component 1330 as described with reference to FIG. 13.

At 1915, the method may include determining a QCL relationship between a SSB and a first downlink channel of one or more downlink channels based on the capability message. The operations of 1915 may be performed in accordance with examples as disclosed herein. In some examples, aspects of the operations of 1915 may be performed by a QCL relationship component 1335 as described with reference to FIG. 13.

At 1920, the method may include transmitting, to the UE based on the QCL relationship, the SSB including a PCI corresponding to the serving cell or the second cell and the first downlink channel, the SSB and the first downlink channel overlapping in time and the PCI including the first PCI or the second PCI. The operations of 1920 may be performed in accordance with examples as disclosed herein. In some examples, aspects of the operations of 1920 may be performed by an SSB and downlink channel overlapping component 1340 as described with reference to FIG. 13.

The following provides an overview of aspects of the present disclosure:

Aspect 1: A method for wireless communications at a UE, comprising: determining a first physical layer cell identifier corresponding to a serving cell configured for the UE and a second physical layer cell identifier corresponding to a second cell configured for the UE different than the serving cell; receiving a synchronization signal block associated with a physical layer cell identifier corresponding to the serving cell or the second cell, the physical layer cell identifier comprising the first physical layer cell identifier or the second physical layer cell identifier; determining a quasi co-location relationship between the synchronization signal block and one or more downlink channels that are overlapping in time with the synchronization signal block based at least in part on the physical layer cell identifier; and processing a first downlink channel of the one or more downlink channels based at least in part on the quasi co-location relationship.

Aspect 2: The method of aspect 1, wherein determining the quasi co-location relationship comprises: determining the quasi co-location relationship between the synchronization signal block and the one or more downlink channels that are overlapping in time with the synchronization signal block based at least in part on a capability of the UE.

Aspect 3: The method of aspect 2, further comprising: transmitting an indication of the capability of the UE, wherein the quasi co-location relationship is determined based at least in part on the indication of the capability of the UE.

Aspect 4: The method of any of aspects 2 through 3, wherein the capability of the UE comprises a capability of receiving a single beam at a time, of receiving two beams simultaneously, or a combination thereof.

Aspect 5: The method of any of aspects 1 through 4, wherein determining the quasi co-location relationship comprises: determining the quasi co-location relationship between the synchronization signal block and demodulation reference signals of the one or more downlink channels.

Aspect 6: The method of any of aspects 1 through 5, wherein determining the quasi co-location relationship comprises: determining the quasi co-location relationship between the synchronization signal block and the one or more downlink channels that are overlapping in time with the synchronization signal block based at least in part on the one or more downlink channels being associated with the physical layer cell identifier.

Aspect 7: The method of aspect 6, wherein the one or more downlink channels comprise a control resource set pool index value associated with the physical layer cell identifier.

Aspect 8: The method of any of aspects 1 through 7, further comprising: determining the first downlink channel and a second downlink channel of the one or more downlink channels overlap in time with the synchronization signal block, wherein the first downlink channel is associated with the first physical layer cell identifier and the second downlink channel is associated with the second physical layer cell identifier.

Aspect 9: The method of any of aspects 1 through 8, further comprising: receiving a second synchronization signal block that is overlapping in time with the synchronization signal block, the second synchronization signal block comprising a separate physical layer cell identifier different than the physical layer cell identifier, wherein the separate physical layer cell identifier comprises the second physical layer cell identifier based at least in part on the physical layer cell identifier comprising the first physical layer cell identifier or the separate physical layer cell identifier comprises the first physical layer cell identifier based at least in part on the physical layer cell identifier comprising the second physical layer cell identifier.

Aspect 10: The method of aspect 9, further comprising: determining a second quasi co-location relationship between the second synchronization signal block and a second downlink channel of the one or more downlink channels based at least in part on the second synchronization signal block and the second downlink channel being associated with the separate physical layer cell identifier; and processing the second downlink channel based at least in part on the second quasi co-location relationship.

Aspect 11: The method of any of aspects 1 through 10, wherein determining the quasi co-location relationship comprises: determining the quasi co-location relationship between the synchronization signal block and the one or more downlink channels that are overlapping in time with the synchronization signal block based at least in part on a number of downlink channels of the one or more downlink channels.

Aspect 12: The method of any of aspects 1 through 11, further comprising: determining the first downlink channel is associated with at least two transmission configuration indicator states, wherein the quasi co-location relationship is determined based at least in part on the at least two transmission configuration indicator states.

Aspect 13: The method of aspect 12, wherein a first transmission configuration indicator state of the at least two transmission configuration indicator states is determined for the quasi co-location relationship between the synchronization signal block and the first downlink channel.

Aspect 14: The method of any of aspects 12 through 13, further comprising: determining the first downlink channel overlaps in time with the synchronization signal block and a second synchronization signal block; and determining a first quasi co-location relationship between the first downlink channel and the synchronization signal block and a second quasi co-location relationship between the first downlink channel and the second synchronization signal block, the first quasi co-location relationship based at least in part on a first transmission configuration indicator state of the at least two transmission configuration indicator states and the second quasi co-location relationship based at least in part on a second transmission configuration indicator state of the at least two transmission configuration indicator states.

Aspect 15: The method of any of aspects 1 through 14, wherein the first physical layer cell identifier comprises a serving cell physical layer cell identifier.

Aspect 16: The method of any of aspects 1 through 15, wherein the second physical layer cell identifier comprises a non-serving cell physical layer cell identifier.

Aspect 17: The method of any of aspects 1 through 16, wherein the serving cell is associated with a network entity, and the second cell is associated with the network entity or an additional network entity.

Aspect 18: The method of any of aspects 1 through 17, wherein the quasi co-location relationship corresponds to a same receive beam used to receive the synchronization signal block and the first downlink channel.

Aspect 19: A method for wireless communications at a network entity, comprising: transmitting, to a UE, first signaling associated with a first physical layer cell identifier corresponding to a serving cell configured for the UE and second signaling comprising a second physical layer cell identifier corresponding to a second cell configured for the UE different than the serving cell; receiving, from the UE, a capability message comprising an indication of one or more capabilities of the UE; determining a quasi co-location relationship between a synchronization signal block and a first downlink channel of one or more downlink channels based at least in part on the capability message; and transmitting, to the UE based at least in part on the quasi co-location relationship, the synchronization signal block comprising a physical layer cell identifier corresponding to the serving cell or the second cell and the first downlink channel, the synchronization signal block and the first downlink channel overlapping in time and the physical layer cell identifier comprising the first physical layer cell identifier or the second physical layer cell identifier.

Aspect 20: The method of aspect 19, further comprising: determining the quasi co-location relationship between the synchronization signal block and the first downlink channel based at least in part on the first downlink channel being associated with the physical layer cell identifier.

Aspect 21: The method of aspect 20, wherein the first downlink channel comprises a control resource set pool index value associated with the physical layer cell identifier.

Aspect 22: The method of any of aspects 19 through 21, wherein the first physical layer cell identifier comprises a serving cell physical layer cell identifier.

Aspect 23: The method of any of aspects 19 through 22, wherein the second physical layer cell identifier comprises a non-serving cell physical layer cell identifier.

Aspect 24: The method of any of aspects 19 through 23, wherein the serving cell is associated with the network entity, and the second cell is associated with the network entity or an additional network entity.

Aspect 25: The method of any of aspects 19 through 24, wherein the quasi co-location relationship corresponds to a same receive beam used by the UE to receive the synchronization signal block and the first downlink channel.

Aspect 26: The method of any of aspects 19 through 25, wherein the one or more capabilities of the UE comprise a capability of receiving a single beam at a time, of receiving two beams simultaneously, or a combination thereof.

Aspect 27: An apparatus for wireless communications at a UE, comprising a processor; memory coupled with the processor; and instructions stored in the memory and executable by the processor to cause the apparatus to perform a method of any of aspects 1 through 18.

Aspect 28: An apparatus for wireless communications at a UE, comprising at least one means for performing a method of any of aspects 1 through 18.

Aspect 29: A non-transitory computer-readable medium storing code for wireless communications at a UE, the code comprising instructions executable by a processor to perform a method of any of aspects 1 through 18.

Aspect 30: An apparatus for wireless communications at a network entity, comprising a processor; memory coupled with the processor; and instructions stored in the memory and executable by the processor to cause the apparatus to perform a method of any of aspects 19 through 26.

Aspect 31: An apparatus for wireless communications at a network entity, comprising at least one means for performing a method of any of aspects 19 through 26.

Aspect 32: A non-transitory computer-readable medium storing code for wireless communications at a network entity, the code comprising instructions executable by a processor to perform a method of any of aspects 19 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   at least one processor; and
   at least one memory coupled with the at least one processor, the at least one memory storing instructions executable by the at least one processor to cause the UE to:
   determine a first physical layer cell identifier corresponding to a serving cell configured for the UE and a second physical layer cell identifier corresponding to a second cell configured for the UE different than the serving cell;
   receive a synchronization signal block associated with a physical layer cell identifier corresponding to the serving cell or the second cell, the physical layer cell identifier comprising the first physical layer cell identifier or the second physical layer cell identifier;
   determine a quasi co-location with TypeD relationship between the synchronization signal block and one or more downlink channels that are overlapping in time with the synchronization signal block based at least in part on the one or more downlink channels being associated with the physical layer cell identifier that is associated with the synchronization signal block; and
   process a first downlink channel of the one or more downlink channels based at least in part on the quasi co-location with TypeD relationship.

2. The UE of claim 1, wherein, to determine the quasi co-location with TypeD relationship are executable by the at least one processor to cause the UE to:
   determine the quasi co-location with TypeD relationship between the synchronization signal block and the one or more downlink channels that are overlapping in time with the synchronization signal block based at least in part on a capability of the UE.

3. The UE of claim 2, wherein the instructions are further executable by the at least one processor to cause the UE to:
   transmit an indication of the capability of the UE, wherein the quasi co-location with TypeD relationship is determined based at least in part on the indication of the capability of the UE.

4. The UE of claim 2, wherein the capability of the UE comprises a capability of receiving a single beam at a time, of receiving two beams simultaneously, or a combination thereof.

5. The UE of claim 1, wherein, to determine the quasi co-location with TypeD relationship are executable by the at least one processor to cause the UE to:
   determine the quasi co-location with TypeD relationship between the synchronization signal block and demodulation reference signals of the one or more downlink channels.

6. The UE of claim 1, wherein the one or more downlink channels comprise a control resource set pool index value associated with the physical layer cell identifier.

7. The UE of claim 1, wherein the instructions are further executable by the at least one processor to cause the UE to:
   determine the first downlink channel and a second downlink channel of the one or more downlink channels overlap in time with the synchronization signal block, wherein the first downlink channel is associated with the first physical layer cell identifier and the second downlink channel is associated with the second physical layer cell identifier.

8. The UE of claim 1, wherein the instructions are further executable by the at least one processor to cause the UE to:
   receive a second synchronization signal block that is overlapping in time with the synchronization signal block, the second synchronization signal block comprising a separate physical layer cell identifier different than the physical layer cell identifier, wherein the separate physical layer cell identifier comprises the second physical layer cell identifier based at least in part on the physical layer cell identifier comprising the first physical layer cell identifier or the separate physical layer cell identifier comprises the first physical layer cell identifier based at least in part on the physical layer cell identifier comprising the second physical layer cell identifier.

9. The UE of claim 8, wherein the instructions are further executable by the at least one processor to cause the UE to:
determine a second quasi co-location relationship between the second synchronization signal block and a second downlink channel of the one or more downlink channels based at least in part on the second synchronization signal block and the second downlink channel being associated with the separate physical layer cell identifier; and
process the second downlink channel based at least in part on the second quasi co-location relationship.

10. The UE of claim 1, wherein, to determine the quasi co-location with TypeD relationship are executable by the at least one processor to cause the UE to:
determine the quasi co-location with TypeD relationship between the synchronization signal block and the one or more downlink channels that are overlapping in time with the synchronization signal block based at least in part on a number of downlink channels of the one or more downlink channels.

11. The UE of claim 1, wherein the instructions are further executable by the at least one processor to cause the UE to:
determine the first downlink channel is associated with at least two transmission configuration indicator states, wherein the quasi co-location with TypeD relationship is determined based at least in part on the at least two transmission configuration indicator states.

12. The UE of claim 11, wherein a first transmission configuration indicator state of the at least two transmission configuration indicator states is determined for the quasi co-location with TypeD relationship between the synchronization signal block and the first downlink channel.

13. The UE of claim 11, wherein the instructions are further executable by the at least one processor to cause the UE to:
determine the first downlink channel overlaps in time with the synchronization signal block and a second synchronization signal block; and
determine a first quasi co-location relationship between the first downlink channel and the synchronization signal block and a second quasi co-location relationship between the first downlink channel and the second synchronization signal block, the first quasi co-location relationship based at least in part on a first transmission configuration indicator state of the at least two transmission configuration indicator states and the second quasi co-location relationship based at least in part on a second transmission configuration indicator state of the at least two transmission configuration indicator states.

14. The UE of claim 1, wherein the first physical layer cell identifier comprises a serving cell physical layer cell identifier.

15. The UE of claim 1, wherein the second physical layer cell identifier comprises a non-serving cell physical layer cell identifier.

16. The UE of claim 1, wherein the serving cell is associated with a network entity, and the second cell is associated with the network entity or an additional network entity.

17. The UE of claim 1, wherein the quasi co-location with TypeD relationship corresponds to a same receive beam used to receive the synchronization signal block and the first downlink channel.

18. A network entity, comprising:
at least one processor; and
at least one memory coupled with the at least one processor, the at least one memory storing instructions executable by the at least one processor to cause the network entity to:
transmit, to a user equipment (UE), first signaling associated with a first physical layer cell identifier corresponding to a serving cell configured for the UE and second signaling comprising a second physical layer cell identifier corresponding to a second cell configured for the UE different than the serving cell;
receive, from the UE, a capability message comprising an indication of one or more capabilities of the UE;
determine a quasi co-location with TypeD relationship between a synchronization signal block and a first downlink channel of one or more downlink channels based at least in part on the capability message and based at least in part on first downlink channel being associated with a physical layer cell identifier; and
transmit, to the UE based at least in part on the quasi co-location with TypeD relationship, the synchronization signal block comprising the physical layer cell identifier corresponding to the serving cell or the second cell and the first downlink channel, the synchronization signal block and the first downlink channel overlapping in time and the physical layer cell identifier comprising the first physical layer cell identifier or the second physical layer cell identifier.

19. The network entity of claim 18, wherein the first downlink channel comprises a control resource set pool index value associated with the physical layer cell identifier.

20. The network entity of claim 18, wherein the first physical layer cell identifier comprises a serving cell physical layer cell identifier.

21. The network entity of claim 18, wherein the second physical layer cell identifier comprises a non-serving cell physical layer cell identifier.

22. The network entity of claim 18, wherein the serving cell is associated with the network entity, and the second cell is associated with the network entity or an additional network entity.

23. The network entity of claim 18, wherein the quasi co-location with TypeD relationship corresponds to a same receive beam used by the UE to receive the synchronization signal block and the first downlink channel.

24. The network entity of claim 18, wherein the one or more capabilities of the UE comprise a capability of receiving a single beam at a time, of receiving two beams simultaneously, or a combination thereof.

25. A method for wireless communications by a user equipment (UE), comprising:
determining a first physical layer cell identifier corresponding to a serving cell configured for the UE and a second physical layer cell identifier corresponding to a second cell configured for the UE different than the serving cell;
receiving a synchronization signal block associated with a physical layer cell identifier corresponding to the serving cell or the second cell, the physical layer cell identifier comprising the first physical layer cell identifier or the second physical layer cell identifier;

determining a quasi co-location with TypeD relationship between the synchronization signal block and one or more downlink channels that are overlapping in time with the synchronization signal block based at least in part on the one or more downlink channels being associated with the physical layer cell identifier that is associated with the synchronization signal block; and processing a first downlink channel of the one or more downlink channels based at least in part on the quasi co-location with TypeD relationship.

26. The method of claim 25, wherein determining the quasi co-location with TypeD relationship comprises:

determining the quasi co-location with TypeD relationship between the synchronization signal block and the one or more downlink channels that are overlapping in time with the synchronization signal block based at least in part on a capability of the UE.

27. The method of claim 25, wherein determining the quasi co-location with TypeD relationship comprises:

determining the quasi co-location with TypeD relationship between the synchronization signal block and demodulation reference signals of the one or more downlink channels.

28. A method for wireless communications by a network entity, comprising:

transmitting, to a user equipment (UE), first signaling associated with a first physical layer cell identifier corresponding to a serving cell configured for the UE and second signaling comprising a second physical layer cell identifier corresponding to a second cell configured for the UE different than the serving cell;

receiving, from the UE, a capability message comprising an indication of one or more capabilities of the UE;

determining a quasi co-location with TypeD relationship between a synchronization signal block and a first downlink channel of one or more downlink channels based at least in part on the capability message and based at least in part on first downlink channel being associated with a physical layer cell identifier; and transmitting, to the UE based at least in part on the quasi co-location with TypeD relationship, the synchronization signal block comprising the physical layer cell identifier corresponding to the serving cell or the second cell and the first downlink channel, the synchronization signal block and the first downlink channel overlapping in time and the physical layer cell identifier comprising the first physical layer cell identifier or the second physical layer cell identifier.

* * * * *